United States Patent
Shimizu

(10) Patent No.: US 7,130,352 B2
(45) Date of Patent: Oct. 31, 2006

(54) TRANSCEIVER APPARATUS AND TRANSCEIVING METHOD IN COMMUNICATION SYSTEM

(75) Inventor: Masatsugu Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 865 days.

(21) Appl. No.: 10/037,836

(22) Filed: Jan. 3, 2002

(65) Prior Publication Data

US 2003/0035467 A1 Feb. 20, 2003

(30) Foreign Application Priority Data

Aug. 8, 2001 (JP) .............................. 2001-240356

(51) Int. Cl.
*H04K 1/10* (2006.01)
*H04L 27/28* (2006.01)

(52) U.S. Cl. ....................... 375/260; 375/130; 375/136; 375/316; 455/59

(58) Field of Classification Search ................. 375/130, 375/136, 260, 316
See application file for complete search history.

(56) References Cited

U.S. PATENT DOCUMENTS

| | | | | |
|---|---|---|---|---|
| 6,510,137 | B1 * | 1/2003 | Belaiche | .................... 370/232 |
| 2002/0015405 | A1 * | 2/2002 | Sepponen et al. | .......... 370/389 |
| 2003/0039236 | A1 * | 2/2003 | Uga | ............................ 370/345 |

FOREIGN PATENT DOCUMENTS

| | | |
|---|---|---|
| EP | 1 104 130 | 5/2001 |
| JP | 63062426 | 3/1988 |
| JP | 11145929 | 5/1999 |
| WO | 00/36782 | 6/2000 |
| WO | 02/065720 | 8/2002 |

OTHER PUBLICATIONS

EURESCOM (Review of UMTS air interface, 1999) pp. 1-91.*
Dahlman, et al., "UMTS/IMT-2000 Based on Wideband CDMA" IEEE Communications Magazine, vol. 36, No. 9 Sep. 1998, pp. 70-80, XP000784828: ISSN: 0163-6804.
Zhang, et al., "A Novel Transmission and Transport Channel Multiplexing Scheme for WCDMA" 'Online! Jun. 1999, TSG RAN Working Group: XP002229785 URL:http://www.3gpp.org/ftp/tsg_ran/WG1_RL1/TSGR1_05/Docs/Pdf/r1-99628.pdf Retrieved from Internet on: Nov. 5, 2002.
European Search Report dated Dec. 9, 2002.
"WCDMA-The Radio Interface for Future Mobile Multimedia Communications" By Dahlman, et al.; IEEE Transactions on Vehicular Technology, vol. 47, No. 4, Nov. 1998; pp. 1105-1117 XP-000875424.

* cited by examiner

*Primary Examiner*—Temesghen Ghebretinsae
*Assistant Examiner*—Juan Alberto Torres
(74) *Attorney, Agent, or Firm*—Katten Muchin Rosenman LLP

(57) ABSTRACT

Disclosed is a communication system in which it is possible to detect a TFI (Transport Format Indicator) even if a TFCI (Transport Format Combination Indicator) cannot be decoded correctly. The system includes a transmitting apparatus which, when a transmission is made, encodes transmit data of each transport channel (TrCH) at a prescribed transmission time interval (TTI), partitions the encoded data at a frame period to obtain frame data of a prescribed bit length, multiplexes and transmits the frame data of each TrCH and transmits TFCI information that specifies the frame data length of each TrCH. The system includes a receiving apparatus for comparing, on a per-TrCH basis, the TFIs of a plurality of frames within a transmission time interval (TTI) conforming to the TrCH and, if TFIs differ, deciding the transport format (TFI) in this transmission time interval (TTI) by majority decision, etc.

19 Claims, 24 Drawing Sheets

FIG. 4A
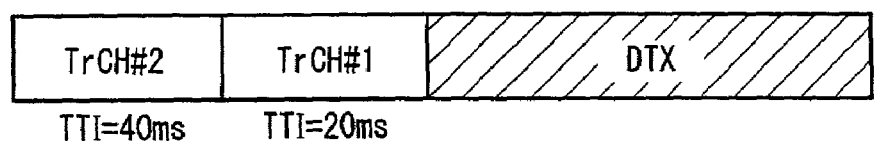
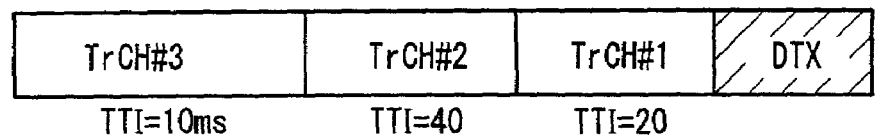
FIG. 4B
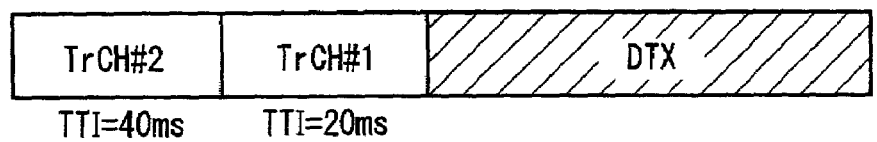
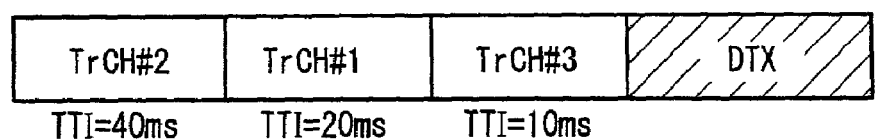

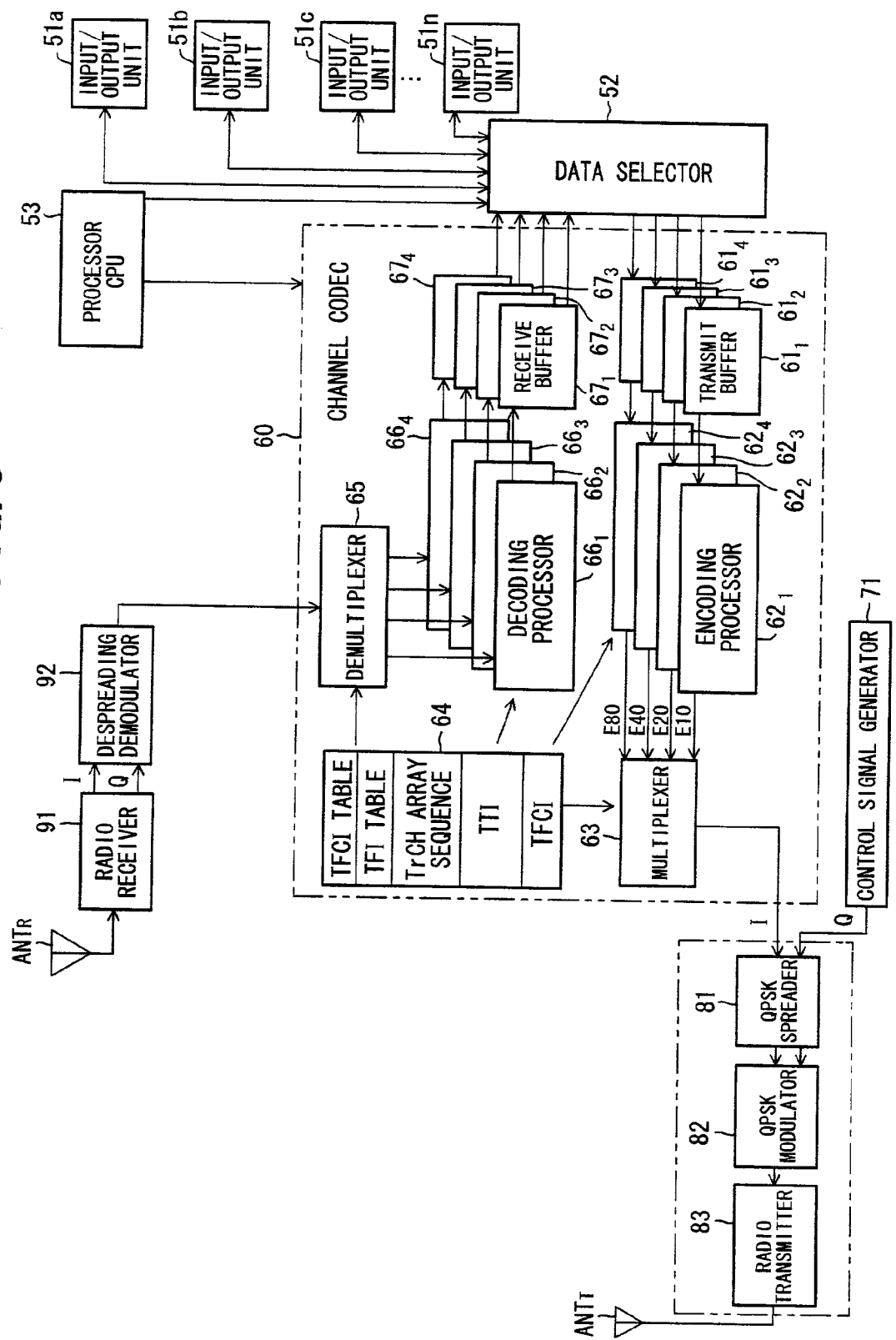

FIG. 6A

TFI TABLE

| TFI | FORMAT OF TrCH#1 | FORMAT OF TrCH#2 |
|---|---|---|
| 0 | 336bit × 0 | 148bit × 0 |
| 1 | 336bit × 1 | 148bit × 1 |
| 2 | 336bit × 2 | — |
| 3 | 336bit × 4 | — |

FIG. 6B

TFCI TABLE

| TFCI | FORMAT OF TrCH#1 | FORMAT OF TrCH#2 |
|---|---|---|
| 0 | TFI#0 (336bit × 0) | TFI#0 (148bit × 0) |
| 1 | TFI#0 | TFI#1 (148bit × 1) |
| 2 | TFI#1 (336bit × 1) | TFI#0 |
| 3 | TFI#1 | TFI#1 |
| 4 | TFI#2 (336bit × 2) | TFI#0 |
| 5 | TFI#2 | TFI#1 |
| 6 | TFI#3 (336bit × 4) | TFI#0 |
| 7 | TFI#3 | TFI#1 |

FIG. 25

EXAMPLE OF TrCH FORMATS

| TFI | FORMAT OF TrCH#1 | FORMAT OF TrCH#2 |
|---|---|---|
| 0 | 336bit × 0 | 148bit × 0 |
| 1 | 336bit × 1 | 148bit × 1 |
| 2 | 336bit × 2 | – |
| 3 | 336bit × 4 | – |

PRIOR ART

FIG. 26

EXAMPLE OF TFCIs

| TFCI | TFI OF TrCH#1 | TFI OF TrCH#2 |
|---|---|---|
| 0 | 0 | 0 |
| 1 | 0 | 1 |
| 2 | 1 | 0 |
| 3 | 1 | 1 |
| 4 | 2 | 0 |
| 5 | 2 | 1 |
| 6 | 3 | 0 |
| 7 | 3 | 1 |

PRIOR ART

FIG. 27

TFI STRUCTURE AND TFCI AT MULTIPLEXING OF TrCHs

| FRAME | TFI | | TFCI |
|---|---|---|---|
|  | TrCH#1 | TrCH#2 |  |
| FIRST FRAME | 2 | 1 | 5 |
| SECOND FRAME | 2 | 1 | 5 |
| THIRD FRAME | 1 | 1 | 3 |
| FOURTH FRAME | 1 | 1 | 3 |

PRIOR ART

FIG. 28
PRIOR ART
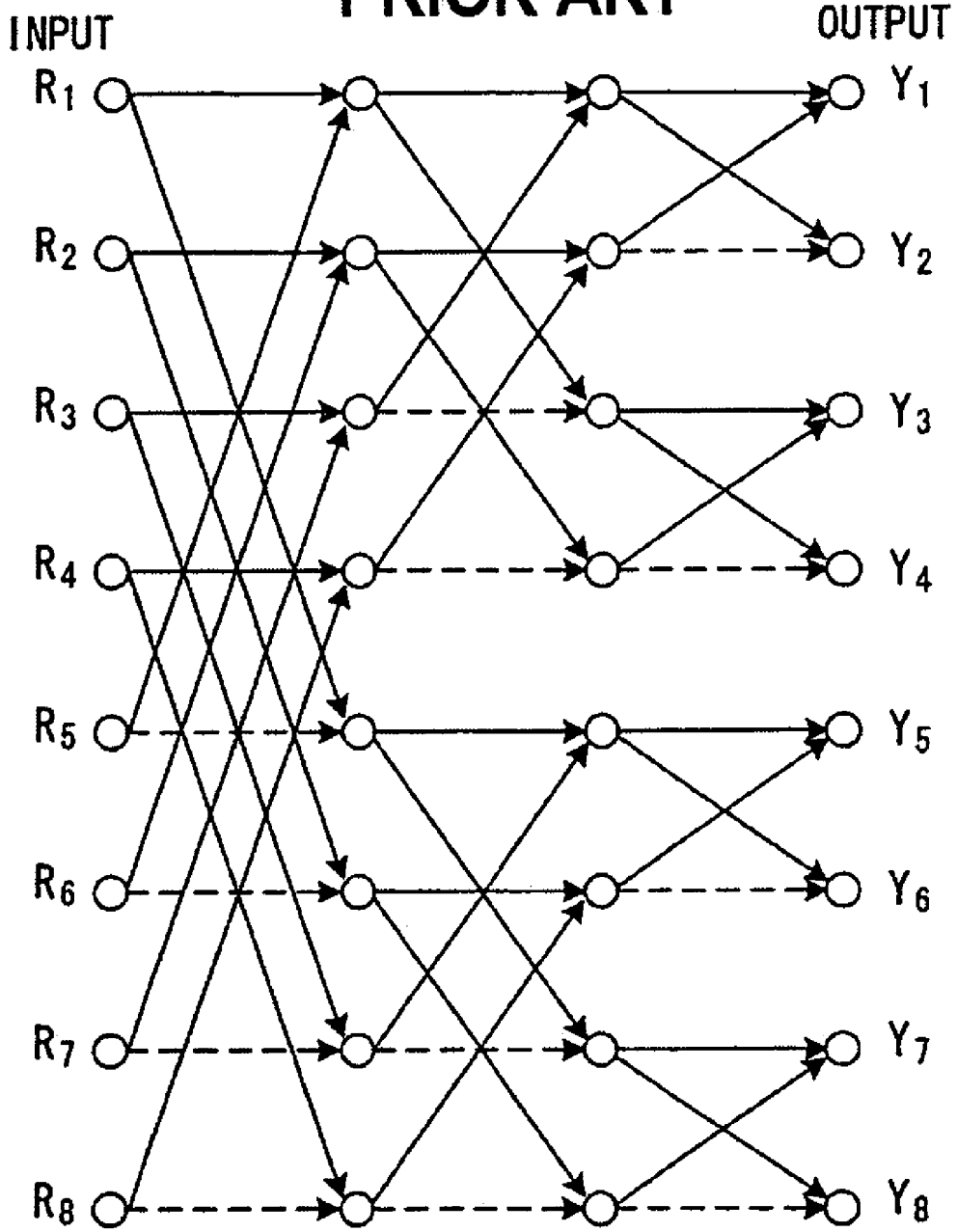

TRANSCEIVER APPARATUS AND TRANSCEIVING METHOD IN COMMUNICATION SYSTEM

BACKGROUND OF THE INVENTION

This invention relates to a transceiver apparatus and transceiving method in a W-CDMA system. More particularly, the invention relates to a transceiver apparatus and transceiving method in a W-CDMA system for demultiplexing and decoding transmit data on a plurality of multiplexed transport channels (TrCH) using a transport format (TFI: Transport Format Indicator).

FIG. 18 is a block diagram illustrating the structure of a mobile station according to the prior art. When data is transmitted, data sent from input/output units 1a to 1n is input to a data selector 2 via internal voice codecs and video codecs, etc. The input/output units 1a to 1n are a voice input/output device and an image input/output device, etc., of a cellular telephone. In accordance with a command from a processor 3, the data selector 2 selectively inputs the transmit data, which enters via the voice or video codecs of the input/output units 1a to 1n, to transmit buffers $5_1$ to $5_4$ having encoding time lengths of 10, 20, 40 and 80 ms, respectively. For example, since voice code is transmitted using three transport channels (TrCH), the voice code output from voice codecs is divided into three portions and these three portions are input to the transmit buffers of the corresponding transport channels (TrCH). That is, a voice codec expresses a voice signal by ① an LSP parameter expressing the human vocal tract, ② a pitch-period component expressing the periodicity of voice, ③ a noise component included in voice, ④ gain of the pitch-period component and ⑤ gain of the noise component, extracts each of these elements from input voice, quantizes these elements and outputs the quantized data as voice code. The LSP parameter, pitch-period component and pitch gain are important and hence are assigned to a first transport channel. The noise component and noise gain may contain a small amount of error without critical consequences and therefore are assigned to second and third transport channels.

The transmit buffers $5_1$ to $5_4$ write the transmit data continuously to buffer memories (not shown) every 10 ms and read out the transmit data at a stroke in burst fashion every 10 ms, 20 ms, 40 ms, 80 ms and input the read data to encoding processors $6_1$ to $6_4$, which constitute the succeeding stage.

The encoding processors $6_1$ to $6_4$ encode the transmit data of the respective lengths 10, 20, 40 and 80 ms in accordance with convolutional encoding or turbo encoding and input the encoded data to a multiplexer 7. More specifically, the encoding processor $6_1$ outputs encoded data E10 having a duration of 10 ms, the encoding processor $6_2$ outputs encoded data E20 having a duration of 20 ms, the encoding processor $6_3$ outputs encoded data E40 having a duration of 40 ms, and the encoding processor $6_4$ outputs encoded data E80 having a duration of 80 ms. For example, as shown in FIG. 19, the encoder $6_1$ outputs encoded data 10 ms-1 every 10 ms, the encoder $6_2$ outputs the first half 20 ms-1 and second half 20 ms-2 of the encoded data #20 in order every 10 ms, the encoder $6_3$ outputs one-quarter portions 40 ms-1, 40 ms-2, 40 ms-3, 40 ms-4 of the encoded data E40 in order every 10 ms, and the encoder $6_4$ outputs one-eighth portions 80 ms-1, 80 ms-2, 80 ms-3, 80 ms-4, 80 ms-5, 80 ms-6, 80 ms-7, 80 ms-8, of the encoded data E80 in order every 10 ms.

The multiplexer 7 multiplexes the encoded data that enters from the encoding processors $6_1$–$6_4$ every 10 ms, creates one frame's worth of multiplexed data and transmits the multiplexed encoded data as in-phase component data. FIG. 19 is a diagram useful in describing the multiplexing method. In the initial tenth millisecond, encoded data {10 ms-1, 20 ms-1, 40 ms-1, 80 ms-1} is multiplexed and transmitted as a first frame. Subsequently, in $20^{th}$ to $80^{th}$ milliseconds, the following multiplexed data is created and transmitted as second to eighth frames:

multiplexed data: {10 ms-1, 20 ms-2, 40 ms-2, 80 ms-2} ... second frame
multiplexed data: {10 ms-1, 20 ms-1, 40 ms-3, 80 ms-3} ... third frame
multiplexed data: {10 ms-1, 20 ms-1, 40 ms-4, 80 ms-4} ... fourth frame
multiplexed data: {10 ms-1, 20 ms-1, 40 ms-1, 80 ms-5} ... fifth frame
multiplexed data: {10 ms-1, 20 ms-2, 40 ms-2, 80 ms-6} ... sixth frame
multiplexed data: {10 ms-1, 20 ms-1, 40 ms-3, 80 ms-7} ... seventh frame
multiplexed data: {10 ms-1, 20 ms-2, 40 ms-4, 80 ms-8} ... eighth frame That is, for a service whose length of encoding time is 10 ms, the data is transmitted frame by frame; for a service whose length of encoding time is 20 ms, the data is transmitted over two frames; for a service whose length of encoding time is 40 ms, the data is transmitted over four frames; and for a service whose length of encoding time is 80 ms, the data is transmitted over eight frames.

A control signal generator 8 outputs control data such as a pilot PILO and TFCI as quadrature-component data at a fixed symbol speed. A QPSK spreader 9 subjects the input in-phase component (I-channel component) and quadrature component (Q-channel component) to spread-spectrum modulation using a predetermined spreading code, effects a digital-to-analog conversion and inputs the analog signal to a QPSK quadrature modulator 10. The latter subjects the I-channel signal and Q-channel signal to QPSK quadrature modulation, and a radio transmitter 11 frequency-converts (IF→RF) the baseband signal from the quadrature modulator 10 to a high-frequency signal, performs high-frequency amplification and transmits the amplified signal from an antenna $ANT_T$.

FIG. 20 is a diagram useful in describing the frame format of an upstream signal from a mobile station to a base station. One frame has a length of 10 ms and is composed of 15 slots $S_0$ to $S_{14}$. User data is mapped to the I channel of QPSK modulation and control data is mapped to the Q channel of QPSK modulation. The number n of bits in each slot in the I channel for user data varies in dependence upon symbol speed. Each slot in the Q channel for control data is composed of ten bits and the symbol speed is a constant 15 kbps. The user data is formed by multiplexing the data of one or more transport channels, and the control data is composed of a TPC (Transmission Power Control) bit, TFCI (Transport Format Combination Indicator), PILOT and FBI.

FIG. 21 is a diagram useful in describing the frame format and slot arrangement of a downstream signal from a base station to a mobile station. One frame has a length of 10 ms and is composed of 15 slots $S_0$ to $S_{14}$. Each slot contains a mixture of user data Data 1, Data 2 and control data TPC, TFCI, PILOT. The data in each slot is distributed in turns to the I channel and Q channel of QPSK quadrature modulation one bit at a time, after which spread-spectrum modulation and quadrature modulation are applied, frequency conversion is carried out and the resultant signal is transmitted to the mobile station.

During reception, a radio receiver 13 subjects a high-frequency signal received from an antenna $ANT_R$ to a frequency conversion (RF→IF conversion) to obtain a baseband signal, subjects the baseband signal to quadrature detection to generate in-phase component (I component) data and quadrature component (Q component) data, applies an analog-to-digital conversion and inputs the digital data to a despreading demodulator 14. The latter applies despread processing to the I- and Q-component signals using a code identical with that of the spreading code, demodulates (synchronously detects) the transmitted encoded data and inputs the data to a demultiplexer 15. As shown in FIG. 22, the following encoded data that has been multiplexed is input to the demultiplexer 15:

multiplexed data: {10 ms-1, 20 ms-2, 40 ms-1, 80 ms-2} . . . first frame
multiplexed data: {10 ms-1, 20 ms-2, 40 ms-1, 80 ms-2} . . . second frame
multiplexed data: {10 ms-1, 20 ms-1, 40 ms-3, 80 ms-3} . . . third frame
multiplexed data: {10 ms-1, 20 ms-1, 40 ms-4, 80 ms-4} . . . fourth frame
multiplexed data: {10 ms-1, 20 ms-1, 40 ms-1, 80 ms-5} . . . fifth frame
multiplexed data: {10 ms-1, 20 ms-2, 40 ms-2, 80 ms-6} . . . sixth frame
multiplexed data: {10 ms-1, 20 ms-1, 40 ms-3, 80 ms-7} . . . seventh frame
multiplexed data: {10 ms-1, 20 ms-2, 40 ms-4, 80 ms-8} . . . eighth frame The demultiplexer 15 inputs the initial 10-ms encoded data 10 ms-1 of each frame to a first decoding processor $16_1$, inputs second 20-ms encoded data 20 ms-1, 20 ms-2 to a second decoding processor $16_2$, inputs third 40-ms encoded data 40 ms-1, 40 ms-2, 40 ms-3, 40 ms-4 to a third decoding processor $16_3$, and inputs fourth 80-ms encoded data 80 ms-1, 80 ms-2, 80 ms-3, 80 ms-4, 80 ms-5, 80 ms-6, 80 ms-7, 80 ms-8 to a fourth decoding processor $16_4$. That is, data of the service for which the length of encoding time is 10 ms is received frame by frame, data of the service for which the length of encoding time is 20 ms is received over two frames, data of the service for which the length of encoding time is 40 ms is received over four frames and data of the service for which the length of encoding time is 80 ms is received over eight frames.

The first decoding processor $16_1$, which applies error correction processing to the encoded data of length 10 ms and decodes the original transmit data, decodes the encoded data 10 ms-1 and inputs the decoded data to a succeeding receive buffer $17_1$ every 10 ms. The second decoding processor $16_2$, which applies error correction processing to the encoded data of length 20 ms and decodes the original transmit data, decodes the encoded data 20 ms-1, 20 ms-2 and inputs the decoded data to a succeeding receive buffer $17_2$ every 20 ms. The third decoding processor $16_3$, which applies error correction processing to the encoded data of length 40 ms and decodes the original transmit data, decodes the encoded data 40 ms-1 to 40 ms-4 and inputs the decoded data to a succeeding receive buffer $17_3$ every 40 ms. The fourth decoding processor $16_4$, which applies error correction processing to the encoded data of length 80 ms and decodes the original transmit data, decodes the encoded data 80 ms-1 to 80 ms-8 and inputs the decoded data to a succeeding receive buffer $17_4$ every 80 ms.

The receive buffers $17_1$, $17_2$, $17_3$ and $17_4$ write the decoded data to buffer memories in a single burst every 10 ms, 20 ms, 40 ms and 80 ms, read the decoded data out of the buffer memories continuously every 10 ms and input the data to the data selector 2. In accordance with a command from the processor CPU 3, the data selector 2 selectively inputs the decoded data, which enters from each of the receive buffers $17_1$ to $17_4$, to the input/output units $1a$ to $1n$. Thus, one feature of a W-CDMA system which can be mentioned is that a plurality of different services can be utilized simultaneously.

The above is a description of the overall operation of the mobile station. Multiplexing and demultiplexing will be described in greater detail below. The data transceive time intervals of the W-CDMA system are stipulated as being 10, 20, 40 and 80 ms. Such a time interval is referred to as a TTI (Transmission Time Interval) and the transceive timing is as shown in FIG. 23 on a per-TTI basis.

The channel codec transmitter (encoding processor) $6i$ (i=1 to 4) in this W-CDMA system accepts data transmitted from a higher layer, executes encoding processing on a per-transport-channel (TrCH) basis, multiplexes the encoded data, maps the multiplexed data to a physical channel and transmits the data. Conversely, the channel codec receiver (decoding processor) $16i$ (i=1 to 4) demultiplexes the data, which has been multiplexed onto the physical channel, on a per-transport-channel (TrCH) basis, executes decoding processing and delivers the results to the higher layer.

When communication starts, conditions necessary for encoding processing, such as the encoding scheme (convolutional encoding, turbo encoding, etc.), TTI and transceive format, are specified for each transport channel (TrCH) by the processor CPU 3. The transmit data is encoded in accordance with the conditions specified. If transmit data is encoded on each transport channel (TrCH), the data is multiplexed frame by frame, mapped to the physical channel and transmitted. The physical-channel data is transmitted in units of 0 ms since one frame has a duration of 10 ms. Accordingly, data having a TTI of 20 ms or greater is divided evenly into frame units of 10 ms and the data is then transmitted upon being mapped to the physical channel taking the time TTI. FIG. 24 illustrates an example in which two transport channels TrCH#1, TrCH#2 of TTIs 20 ms and 40 ms, respectively, are multiplexed and transmitted (TrCH#1=TTI 20 ms, TrCH#2=TTI 40 ms). In FIG. 24, TrCH#1-1 and TrCH#1-2 of first and second frames are the initial 20 ms of data of TrCH#1, and TrCH#1-3 and TrCH#1-4 of third and fourth frames are the next 20 ms of data of TrCH#1.

When the encoded data of each transport channel (TrCH) is multiplexed, mapped to a physical channel and transmitted, a parameter indicating how the encoded data of each transport channel TrCH has been multiplexed is created in such a manner that demultiplexing can be performed correctly on the receiving side, and this parameter is transmitted upon being attached to the physical-channel data. This parameter is referred to as a TFCI (Transmission Format Combination Indicator). The TFCI is uniquely decided by a combination of transport formats which specify the bit length per frame of data transmitted by each transport channel (TrCH).

Transport formats are numbered and each is denoted by TFI (Transport Format Indicator). An example of a TFI table is shown in FIG. 25. In the TFI table of FIG. 25, there are four types of transport formats of the transport channel TrCH#1. These are formats, for which the TFIs are 0, 1, 2 and 3, that transmit 336×0 bits, 336×1 bits, 336×2 bits and 336×3 bits per frame, respectively. Further, there are two types of transport formats of the transport channel TrCH#2. These are formats, for which the TFIs are 0 and 1, that transmit 148×0 bits and 148×1 bits per frame, respectively. If the transport channels are only of the two types TrCH#1 and TrCH#2, then the combinations of TFIs of TrCH#1 and TrCH#2 will be a total of eight and TFCIs shown in the table (TFCI table) of FIG. 26 will be assigned to these combinations.

The transport format TFIs that can be taken on by each transport channel (TrCH) are reported from the processor CPU. In FIG. 24, therefore, if 20-ms data of 336 bits×2 and 20-ms data of 336 bits×1 is transmitted from the TrCH#1 successively and 40-ms data of 148 bits×1 is transmitted from the TrCH#2, the multiplexed data (four frame's worth) mapped to a physical channel becomes the combinations of TFIs shown in FIG. 27, and the TFCIs at this time are shown in the column on the right-hand side.

If the format TFIs of each item of TrCH data mapped to the physical channel are known, as mentioned above, then it will be possible to calculate, from the TFCI table of FIG. 26, the TFCIs that indicate the combinations of TFIs. If TFCIs have been calculated, then a TFCI code word (32-bit data) is created by executing encoding processing similar to that of the user data. The TFCI code word is transmitted together with the physical-channel data.

The receiving side first decodes the TFCI code word and obtains the TFCI. The receiving side refers to the TFCI table on the basis of the TFCI obtained, detects the transport format (TFI) of each TrCH, then examines the mapping status (data length per frame) of each TrCH on the physical channel on the basis of the TFI table, demultiplexes the data on a per-TrCH basis and executes decoding processing.

The TFCI code word is obtained by converting a TFCI value to a code word constituting one row of a Hadamard matrix, by way of example. Processing for decoding the TFCI is executed by subjecting the received code to a Hadamard transform.

Processing for decoding a TFCI code word using a Hadamard transform will be illustrated below. An orthogonal code necessary to understand a Hadamard transform will be described first. When any two code words are orthogonal in Euclidean space, the two code words are referred to as orthogonal code. That is, it is said that code words $u=(u_1, u_2, \ldots, u_{n-1}, u_n)$, $v=(v_1, v_2, \ldots, v_{n-1}, v_n)$ are quadrature code if they satisfy the relationship indicated by the following equation:

$$(u,v) = u_1 v_1 + u_2 v_2 + u_{n-1} v_{n-1} u_n v_n = 0$$

If 0s and 1s of a code word are replaced by +1 and −1, respectively, the result is referred to particularly as an analog orthogonal code. A square matrix of degree n in which code words are arrayed in each row in such a manner that the code words of any two rows will have an orthogonal relationship is referred to as a Hadamard matrix. In other words, a Hadamard matrix is a matrix in which each of the elements is +1 or −1 and any two different rows are orthogonal. An operation in which a vector of n dimensions is multiplied by this matrix is referred to as a Hadamard transform. Equation (1) below is an example of an 8-dimensional Hadamard matrix.

$$H = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \quad (1)$$

Equation (2) below is an example of a Hadamard transform.

$$H \cdot u = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \begin{pmatrix} u_1 \\ u_2 \\ \cdot \\ u_8 \end{pmatrix} = \quad (2)$$

$$\begin{bmatrix} u_1 + u_2 + u_3 + u_4 + u_5 + u_6 + u_7 + u_8 \\ u_1 - u_2 + u_3 - u_4 + u_5 - u_6 + u_7 - u_8 \\ u_1 + u_2 - u_3 - u_4 + u_5 + u_6 - u_7 - u_8 \\ u_1 - u_2 - u_3 + u_4 + u_5 - u_6 - u_7 + u_8 \\ u_1 + u_2 + u_3 + u_4 - u_5 - u_6 - u_7 - u_8 \\ u_1 - u_2 + u_3 - u_4 - u_5 + u_6 - u_7 + u_8 \\ u_1 + u_2 - u_3 - u_4 - u_5 - u_6 + u_7 + u_8 \\ u_1 - u_2 - u_3 + u_4 - u_5 + u_6 + u_7 - u_8 \end{bmatrix}$$

The way in which a Hadamard matrix is used in encoded is as described below. Here 000~111 of transmit data is transformed to code words of first to eighth rows of the Hadamard matrix of Equation (1). Specifically, the data is transformed as follows:

Transmit data 000→(0,0,0,0,0,0,0,0) . . . first row of Hadamard matrix

Transmit data 001→(0,1,0,1,0,1,0,1) . . . second row of Hadamard matrix

Transmit data 010→(0,0,1,1,0,0,1,1) . . . third row of Hadamard matrix

Transmit data 011→(0,1,1,0,0,1,1,0) . . . fourth row of Hadamard matrix

Transmit data 100→(0,0,0,0,1,1,1,1) . . . fifth row of Hadamard matrix

Transmit data 101→(0,1,0,1,1,0,1,0) . . . sixth row of Hadamard matrix

Transmit data 110→(0,0,1,1,1,1,0,0) . . . seventh row of Hadamard matrix

Transmit data 111→(0,1,1,0,1,0,0,1) . . . eighth row of Hadamard matrix

At the time of reception, it is necessary to discriminate transmitted orthogonal code words from received code. The operation performed is the Hadamard transform. For example, assume that R=(0,0,0,0,0,0,0,0) has been received. The following is obtained by the Hadamard transform:

$$H \cdot R = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \begin{pmatrix} R_1 \\ R_2 \\ \cdot \\ R_8 \end{pmatrix} = \begin{pmatrix} 8 \\ 0 \\ 0 \\ 0 \\ 0 \\ 0 \\ 0 \\ 0 \end{pmatrix} \quad (3)$$

Here it is determined that the code word corresponding to 8, which is the largest result of the Hadamard transform (absolute value) from among the candidates of the first to eighth rows, i.e., the code word (0,0,0,0,0,0,0,0) of the first row of the Hadamard matrix, has been sent, and the corresponding data 000 is output. It should be noted that the value of each candidate is likelihood, which indicates the degree of certainty.

The foregoing is an ideal case in which there is no transmission error. However, the transmit data can be reconstructed by the Hadamard transform even in a case where (0,0,0,0,0,0,0,0) has been received as R=(0,0,0,0,0,0,0,1), for example, owing to transmission error. Specifically, the following is obtained by the Hadamard transform:

$$H \cdot R = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \begin{pmatrix} +1 \\ +1 \\ +1 \\ +1 \\ +1 \\ +1 \\ +1 \\ -1 \end{pmatrix} = \begin{pmatrix} +6 \\ +2 \\ +2 \\ -2 \\ +2 \\ -2 \\ -2 \\ +2 \end{pmatrix} \quad (4)$$

Since the largest absolute value (likelihood) among the candidates of the first to eighth rows is +6 of the first row, it is judged that the code word (0,0,0,0,0,0,0,0) of the first row of the Hadamard matrix has been sent, and the corresponding data 000 is output. Thus, each value of the candidate matrix following the Hadamard transform indicates the degree of certainty (likelihood). Equation (4) involves a great deal of computation. For this reason, a computation method shown in FIG. 28 has been proposed to perform the computations more efficiently. In FIG. 28, the solid lines indicate −, the dashed lines indicated + and the circles indicate adders. In accordance with this method of computation, 3×8=24 computations suffice (computations where the arrow marks cross), whereas 8×8=64 computations would be required conventionally. Computation is thus made more efficient.

The fact that a plurality of services can be sent and received upon being multiplexed can be mentioned as a feature of a W-CDMA system. Multiplexing of services is implemented by multiplex processing of transport channels (TrCHs) in the physical channel layer. In order to execute decoding processing, therefore, it is necessary to demultiplex the data of each TrCH. To achieve this, it is necessary to discriminate which transport channel (TrCH) of data has been multiplexed on a physical channel and at what ratio.

Such TrCH multiplexing information can be obtained from the TFCI data (TFCI code word) received together with the user data.

When a received TFCI code word is decoded by an orthogonal transform such as the Hadamard transform, a TFCI indicating the state of TrCH multiplexing of the received user data can be detected. The transport format (TFI) of each TrCH that has been multiplexed onto the physical channel can be detected from the TFCI using the TFCI table. From this the data length used in the process of decoding each TrCH can be calculated using the TFI table.

The encoding processing applied to a TFCI is weaker than the turbo/convolutional processing applied to user data, and the probability that decoding will be erroneous is higher in comparison with user data. That is, there are instances where a correct TFCI cannot be decoded owing to transmission error or the like. If decoding of a TFCI is erroneous, correct TrCH multiplexing information will not be obtained. As a consequence, the user data cannot be demultiplexed correctly for every transport channel (TrCH), with the result that correct decoding can no longer be performed.

Thus, processing for detecting an erroneous TFCI and applying a correction is necessary. In the prior art, however, processing which corrects for an error in TFCI is not particularly executed and user data can not always be decoded correctly.

SUMMARY OF THE INVENTION

Accordingly, an object of the present invention is to make it possible to execute correction processing and detect correct TrCH multiplexing information, i.e., a correct transport format (TFI), even in a case where a TFCI cannot be decoded correctly owing to transmission error or the like, whereby user data can be decoded correctly to reduce reception error.

Another object of the present invention is to so arrange it that even if the transport formation information (TFI) of a transport channel having the shortest (10 ms) transmission time interval TTI cannot be corrected accurately by correction processing, it is possible to correctly decode user data of another transport channel for which the transmission time interval TTI is not the shortest.

According to the present invention, the foregoing objects are attained by providing a receiving apparatus and a receiving method in a CDMA communication system, in which transmit data of each transport channel is encoded at a predetermined transmission time interval (TTI), the encoded data is partitioned at a frame period to obtain frame data of a prescribed bit length, the frame data of each of the transport channels is multiplexed and transmitted, and combination information (TFCI) of transport formats (TFIs) that specify the frame data length of each transport channel is transmitted frame by frame.

A first receiving method in a receiving apparatus according to the present invention comprises the steps of: (1) storing received multiplexed data and decoding a TFCI frame by frame; (2) discriminating a transport format (TFI) in each transport channel frame by frame based upon the TFCI of every frame; (3) comparing, on a per-transport-channel basis, transport formats (TFIs) of a plurality of frames within a prescribed transmission time interval (TTI) that conforms to the transport channel and, if transport formats differ, deciding a transport format (TFI) in the transmission time interval (TTI) by majority decision; (4) identifying bit length per frame of each transport channel based upon the transport format (TFI) decided; (5) demultiplexing, on a per-transport-channel basis, stored multiplexed data on the basis of the bit length; and (6) joining and decoding, in an amount equivalent to the transmission time interval, frame data that has been demultiplexed on a per-transport-channel basis.

If the transmission time interval (TTI) of each service is 20 ms or greater in processing for decoding a TFCI in a W-CDMA system, the transport format (TFI) should be the same regardless of which frame within the transmission time interval (TTI) the transport format is detected in. Accordingly, the first receiving method includes comparing transport formats (TFIs) of a plurality of frames within a transmission time interval (TTI) and, if transport formats do not agree, inferring a correct transport format (TFI) by majority decision, thereby applying a correction. As a result, in accordance with the first receiving method, user data can be decoded correctly even in a case where a TFCI cannot be decoded correctly and TFIs do not agree owing to a transmission error or the like.

A second receiving method in a receiving apparatus according to the present invention comprises the steps of: (1) comparing, on a per-transport-channel basis, transport formats (TFIs) of a plurality of frames within a prescribed transmission time interval (TTI) that conforms to the transport channel and, if transport formats differ, deciding a transport format (TFI) in the transmission time interval (TTI) using likelihood and transport format (TFI) of each frame; (2) demultiplexing multiplexed data on a per-transport-channel basis based upon the transport format (TFI) decided; and (3) joining and decoding, in an amount equivalent to the transmission time interval, frame data that has been demultiplexed on a per-transport-channel basis.

More specifically, in order to decide a transport format (TFI), the likelihoods of identical transport formats (TFIs) in a plurality of frames within a transmission time interval (TTI) are totaled and the transport format (TFI) for which the total of the likelihoods is largest is decided upon as the transport format (TFI) in the transmission time interval (TTI). Alternatively, in order to decide a transport format (TFI), ① a TFCI candidate having the highest likelihood among the likelihoods of TFCI candidates calculated at the time of decoding is decided upon as the TFCI in a frame of interest, degree of reliability of the decided TFCI is calculated using the likelihood of each TFCI candidate and the degree of reliability is retained; and ② a TFCI for which the degree of reliability in a plurality of frames within the transmission time interval (TTI) is highest is searched and a transport format (TFI) is decided based upon the TFCI as the transport format (TFI) in the transmission time interval (TTI).

In accordance with the second receiving method, if transport formats (TFIs) in a transmission time interval (TTI) do not agree, then a correct transport format (TFI) is inferred based upon the maximum likelihood or highest degree of reliability, whereby a correction is applied. As a result, in accordance with the second receiving method, user data can be decoded correctly even in a case where a TFCI cannot be decoded correctly and TFIs do not agree owing to a transmission error or the like.

A third receiving method in a receiving apparatus according to the present invention comprises the steps of: (1) in a transport channel of a longest transmission time interval (TTI), correcting, to a correct TFI, an erroneous transport format (TFI) among transport formats (TFIs) of a plurality of frames within the longest transmission time interval; (2) in a different transport channel, checking to determine whether transport formats of a plurality of frames within a transmission time interval inclusive of the corrected frame agree; and (3) if transport formats do not agree, judging that a transport format (TFI) in a frame other than the corrected frame is correct and correcting the transport format (TFI) in the transmission time interval (TTI). In accordance with the third method, the result of a correction in a transport channel of the longest transmission time interval (TTI) is utilized to correct the TFI of another transport channel so that user data can be decoded correctly.

A fourth receiving method in a receiving apparatus according to the present invention comprises the steps of: (1) storing received multiplexed data and decoding a TFCI frame by frame; (2) discriminating, frame by frame, a transport format (TFI) in each transport channel based upon the TFCI decoded; (3) identifying bit length per frame of each transport channel based upon the transport format (TFI) discriminated; (4) regarding that frame data of each of the transport channels has been multiplexed in order of decreasing transmission time interval (TTI) and demultiplexing the stored multiplexed data on the basis of the multiplexing sequence and the identified bit length of each channel; and (5) joining and decoding, in an amount equivalent to the transmission time interval, frame data that has been demultiplexed on a per-transport-channel basis.

In this case, a transmitting apparatus (1) encodes transmit data of each transport channel at a prescribed transmission time interval (TTI); (2) partitions the encoded data at a frame period to obtain frame data of a prescribed bit length and multiplexes the frame data of each of the transport channels in order of decreasing transmission time interval (TTI); and (3) transmits, together with the multiplexed data, combination information (TFCI) of transport formats (TFIs) that specify the frame data length of each transport channel.

In accordance with the fourth receiving method, even if the transport format (TFI) of a transport channel (TrCH) having the shortest (10 ms) transmission time interval (TTI) cannot be corrected accurately, another transport format (TFI) for which the transmission time interval (TTI) is not the shortest can be revised correctly. As a result, the user data of these transport channels can be demultiplexed and decoded correctly.

Other features and advantages of the present invention will be apparent from the following description taken in conjunction with the accompanying drawings.

BRIEF DESCRIPTION OF THE DRAWINGS

FIGS. 4A, 4B are diagrams useful in describing in describing an overview of a fourth embodiment of the present invention;

FIG. 5 is a block diagram illustrating a mobile station according to the present invention;

FIGS. 6A and 6B are diagrams useful in describing a TFI table and TFCI table, respectively;

FIG. 25 shows an example of transport formats of a TrCH;

FIG. 26 shows an example of TFCIs;

FIG. 27 is a diagram useful in describing the structure of TFI and TFCIs at the time of TrCH multiplexing; and FIG. 28 shows the flow of processing of a high-speed Hadamard transform.

DESCRIPTION OF THE PREFERRED EMBODIMENTS (A) Overview of the Present Invention (a) Overview of First Embodiment

In each transport channel (TrCH), transport formats (TFIs) of a plurality of frames within a transmission time interval (TTI) that conforms to the transport channel are fixed values. That is, in a transport channel (TrCH) whose TTI is 20 ms or greater, transmit data is demultiplexed based upon identical transport formats (TFIs) in a plurality of frames within each transmission time interval (TTI), and the data of each TrCH is multiplexed and transmitted frame by frame. Accordingly, in a case where the TFI value changes within the transmission time interval (TTI), the TFCI of the frame in which the value has changed will contain noise. As a consequence, decoding cannot be performed correctly.

Accordingly, it can be construed that if TFI values differ as a result of decoding on the receiving side, then the TFIs of the greatest number are the TFIs having the correct value. In other words, transport formats (TFIs) within a transmission time interval (TTI) are taken by majority decision and the value possessed by the TFIs of the greatest number is adopted as the correct transport format (TFI). A frame having the minority number of TFIs is adopted as a frame in which the TFCI cannot be decoded correctly; the value of the transport format (TFI) of this frame is corrected.

Figure 1:
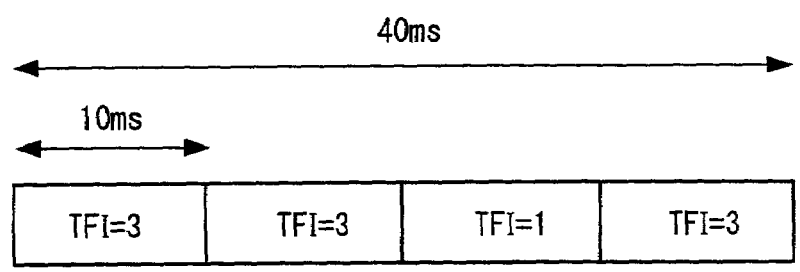
FIG. 1 is a diagram useful in describing an overview of a first embodiment of the present invention.

By way of example, when a TFCI is decoded, assume that transport formats (TFIs) shown in FIG. 1 have been detected in frames in a TrCH whose TTI is 40 ms. When a majority decision on the TFIs is taken, the result is (TFI=3):(TFI=1)= 3:1, it is judged that the result of TFI detection in the third frame is erroneous and the TFI of the third frame is corrected to "3". As a result, the transport formats of this transmission time interval (TTI) are unified at "TFI=3" to effect a correction to a correct transport format.

(b) Overview of second embodiment

Figure 2:
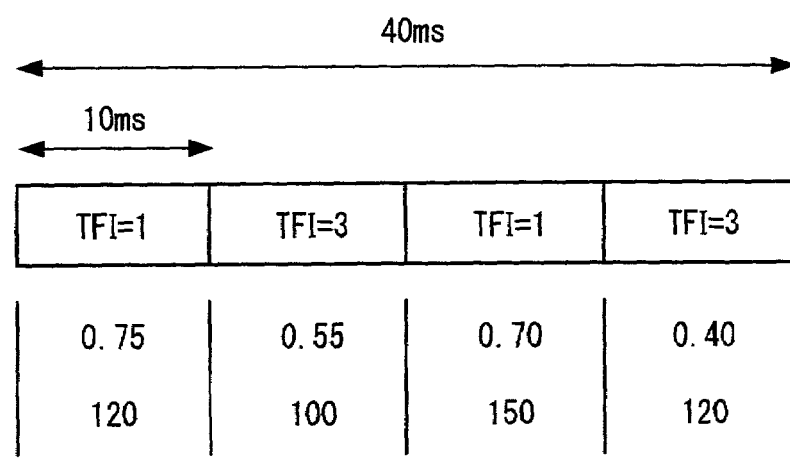
FIG. 2 is a diagram useful in describing an overview of a second embodiment of the present invention.

FIG. 2 is a diagram useful in describing an overview of a second embodiment of the present invention.

In each transport channel (TrCH), transport formats (TFIs) of a plurality of frames within a transmission time interval (TTI) that conforms to the transport channel are fixed values. In a case where detected TFI values change within the transmission time interval (TTI), the TFCI of the frame in which the value has changed will contain noise. As a consequence, decoding cannot be performed correctly. In such case the correct TFI is inferred by utilizing a likelihood found when the TFCI is decoded, thereby making a correction possible.

In the description of the present invention, a high-speed Hadamard transform is used in TFCI decoding processing. However, if the method is a decoding processing method that decides the TFCI using likelihood, then a technique other than a high-speed Hadamard transform can also be used.

<Theoretical Technique>

A TFCI candidate having the highest likelihood [the right side of Equation (2)] among the likelihoods of TFCI candidates calculated at the time of TFCI decoding is decided upon as the TFCI in a frame of interest, reliability Q of the correctness of this TFCI is calculated using the likelihood of each TFCI candidate and the reliability Q is retained. In the case of ideal data in which the input data does not contain noise, 32 output values (likelihoods) of a high-speed Hadamard transform become zero with the exception of the highest likelihood. Accordingly, reliability Q found from the following equation can be adopted as an index of the correctness of the result of TFCI decoding:

$$Q = |\text{highest likelihood}| / \Sigma_i |\text{likelihood}_i| (i=1\sim32) \quad (5)$$

(where the theoretical value of Q is 1). In a case where transport formats (TFIs) of a plurality of frames within a transmission time interval differ, the transport format (TFI) in the frame for which the reliability Q is highest is decided upon as the transport format (TFI) in this transmission time interval (TTI).

For example, assume that a TFCI has been decoded and that TFIs have been detected in a TrCH having a TTI of 40 ms, as shown in FIG. 2. In this case, (TFI=3):(TFI=1)=2:2 is obtained even if the TFIs are subjected to a majority decision according to the method of the first embodiment. This means that it cannot be determined which frame has the erroneous result of TFCI decoding.

Accordingly, the reliability Q of the result of TFCI decoding is calculated frame by frame in accordance with Equation (5) using likelihood found at the time of TFCI decoding processing. The values of Q are assumed to be as shown in FIG. 2. When the reliabilities of respective frames are compared within the transmission time interval (TTI) in FIG. 2, it is found that the reliability Q of the first frame is highest. As a result, the transport formats of this transmission time interval (TTI) are unified at "TFI=1" to effect a correction to a correct transport format.

<Simplified Technique>

Since the theoretical method described above involves much calculation, a somewhat simplified technique will now be described.

When the TFCI in a frame is calculated, the TFCI having the highest likelihood is selected. That is, the likelihood itself is used as an index of the correctness of the TFCI. Transport formats (TFIs) for which several frames have been decoded in a transmission time interval (TTI) should all be identical in value. Accordingly, a frame for which the likelihood is highest may simply be considered to be a frame in which the TFCI has been decoded correctly. However, taking into consideration as many results of processing as possible should give better results. When TFCI decoding is performed, therefore, the value of highest likelihood that was the decisive factor in deciding the TFCI is retained. When one TTI's worth of results have been obtained, the likelihoods of identical transport formats (TFIs) are totaled, the transport format (TFI) for which the total of the likelihoods is largest is decided upon as the transport format (TFI) in this transmission time interval (TTI), the frames of the other TFIs are adopted as frames in which the TFCIs could not be decoded correctly, and the values of the TFIs are corrected.

By way of example, assume that a TFCI has been decoded and that TFIs have been detected in a TrCH having a TTI of 40 ms, as shown in FIG. 2. In this case, (TFI=3):(TFI=1) =2:2 is obtained even if the TFIs are subjected to a majority decision according to the method of the first embodiment. This means that it cannot be determined which frame has the erroneous result of TFCI decoding.

Accordingly, for all identical TFIs that have been detected within a transmission time interval (TTI), the highest likelihoods that decided the TFCI values are summed at the time of TFCI decoding. The total value of highest likelihoods for which TFI=1 holds is 270, the total value of highest likelihoods for which TFI=3 holds is 220, and the total value of highest likelihoods for which TFI=1 holds is greater than the total value of highest likelihoods for which TFI=3 holds. The transport format (TFI) within this transmission time interval (TTI) is judged to be 1, therefore, and the TFIs of the second and fourth frames are corrected to "1". As a result, the transport formats of this transmission time interval (TTI) are unified at "TFI=1" to effect a correction to a correct transport format.

(c) Overview of Second Embodiment

Figure 3:
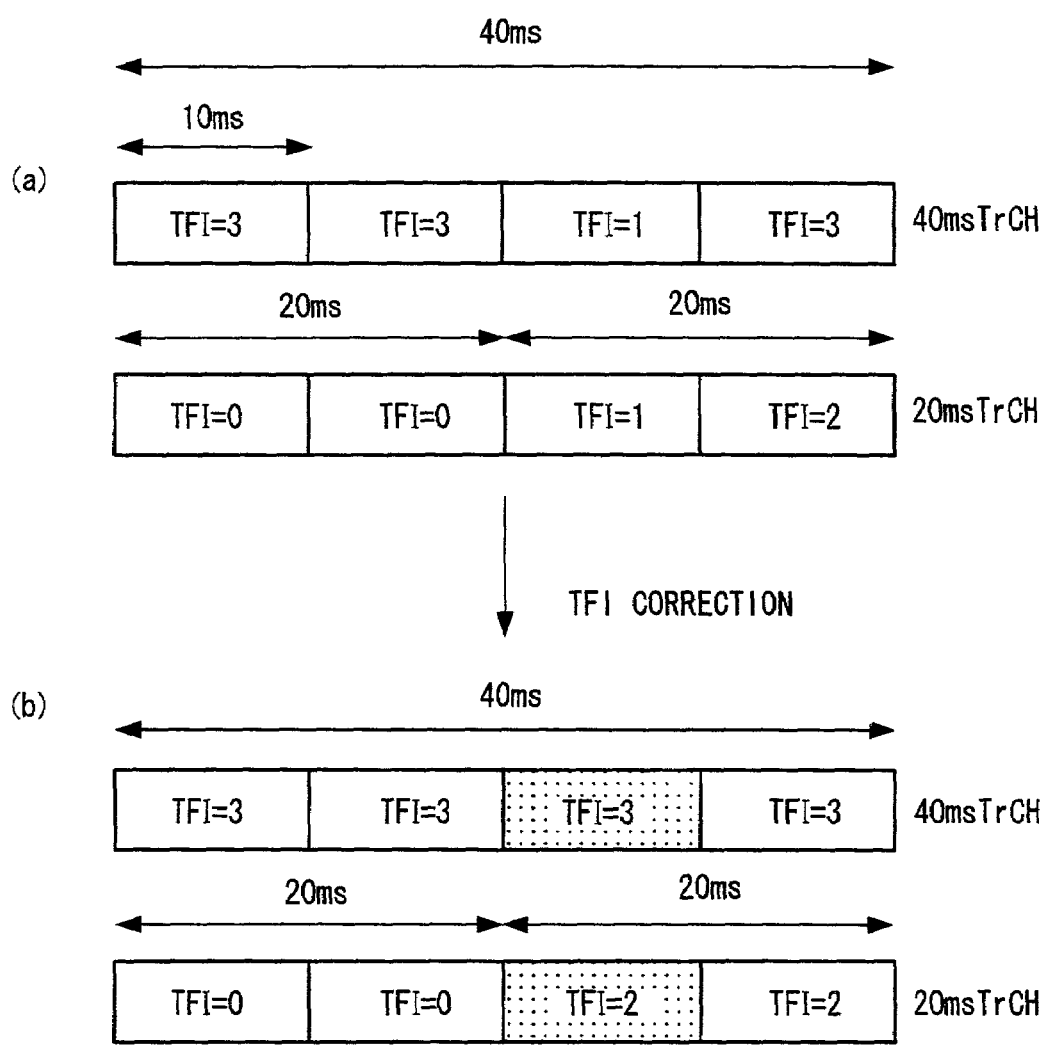
FIG. 3 is a diagram useful in describing an overview of a third embodiment of the present invention.

FIG. 3 is a diagram useful in describing an overview of a third embodiment of the present invention.

In accordance with the first or second embodiment, TFI correction processing is executed with regard to a transport channel (TrCH) of longest transmission time interval (TTI) and any erroneous TFI is corrected among transport formats (TFIs) of a plurality of frames within this longest transmission time interval. Next, in a TrCH (other than the TrCH having the longest transmission time interval) for which the transmission time interval (TTI) is 20 ms or greater, it is determined whether there is agreement among the transport formats (TFIs) of a plurality of frames within this transmission time interval inclusive of the corrected frame. If the transport formats do not agree, it is judged that a transport format (TFI) in a frame other than the corrected frame is correct and the transport format (TFI) in this transmission time interval (TTI) is corrected.

For example, assume that the transport channels (TrCH) currently open are two in number and have TTIs of 40 ms and 20 ms. Further, assume that the result of TFI detection based upon TFCI decoding is as shown in (a) of FIG. 3.

The TFIs of the TrCH having the longest transmission time interval (TTI) of 40 ms are checked in accordance with the first embodiment. Since the TFI of the third frame is different from those of the other frames, the value of this TFI is corrected by majority decision. As a result, it is clarified that the TFCI decoding of the third frame is erroneous. Next, the TFIs of the TrCH having the TTI of 20 ms is checked. When this is done, it is found that the TFIs of the first and second frames in the initial TTI of 20 ms agree but that the values the TFIs in the third and fourth frames in the next TTI of 20 ms differ. Since the TFCI of the third frame is erroneous, the correct TFI is inferred to be that of the fourth frame, i.e., TFI=2. As a result, when TFI correction is applied to the TrCH whose TTI is 20 ms, the result shown in (b) of FIG. 3 is obtained.

(d) Overview of Fourth Embodiment

FIGS. 4A, 4B are diagram useful in describing an overview of a fourth embodiment of the present invention.

In a transport channel (TrCH) whose transmission time interval (TTI) is 20 ms or greater, processing for correcting transport formats (TFIs) can be executed, the user data can be demultiplexed using the result of this processing and decoding processing can be carried out. However, since a transport channel (TrCH) whose transmission time interval (TTI) is 10 ms does not have TFI information of other frames in its transmission time interval (TTI), i.e., since the channel has only a single item of TFI information, correction processing cannot be executed in accordance with the methods of the first to third embodiments. Accordingly, it is not possible to guarantee the correctness of a transport format (TFI) of a TrCH, whose transmission time interval (TTI) is 10 ms, in a frame in which TFCI decoding is erroneous.

Assume that when receive data is demultiplexed on a per-TrCH basis in a frame in which TFCI decoding processing is erroneous, the TrCH whose TTI is 10 ms has been mapped to the beginning of a physical channel. In such case, the data in the entire TrCH having the 10-ms TTI can be demultiplexed correctly if the TFI in the TrCH is not erroneous. If the TFI in the 10-ms TrCH is erroneous, however, then, when the data is demultiplexed, the data acquisition position of another TrCH mapped next will shift and decoding will fail in all subsequent TrCHs.

Accordingly, on the transmitting side, data is mapped, multiplexed and transmitted on a physical channel in order of decreasing transmission time interval (TTI). On the receiving side, it is judged that frame data of each of the transport channels (TrCH) has been multiplexed in order of decreasing transmission time interval (TTI), the received multiplexed data is demultiplexed on a per-transport-channel basis based upon the multiplexing sequence and TFIs, and the frame data that has been demultiplexed on a per-transport-channel basis is joined and decoded in an amount equivalent to the transmission time interval. This arrangement is such that even if a TFI is erroneous in a TrCH having a 10-ms TTI, there is the possibility that the correction of the TFI will have been performed correctly if the TTI is 20 ms or greater. As a result, decoding failure can be reduced in all transport channels (TrCHs).

This will be described in accordance with FIGS. 4A, 4B. Assume that open transport channels (TrCH) include a TrCH having a TTI of 10 ms and that the TrCH having the TTI of 10 ms has been mapped to the physical channel ahead of transport channels (TrCH) having TTIs of 20 ms or greater. Assume for example that the transmission time intervals (TTIs) of TrCH#3, TrCH#1 and TrCH#2 are 10 ms, 20 ms and 40 ms, respectively. In this case, data on TrCH#1, TrCH#2 have been multiplexed and transmitted but TFCI decoding is erroneous in a certain frame and, as a result of the erroneous TFCI, it is judged erroneously that the data of TrCH#1, TrCH#2 and TrCH#3 has been multiplexed, as shown in FIG. 4A. In other words, although the data of TrCH#3 having the transmission time interval (TTI) of 10 ms does not actually exist, there are instances where it is judged that the data of TrCH#3 is present owing to the result of TFCI decoding. It should be noted that even if TFCI decoding is erroneous, the TFIs of TrCH#1m, TrCH#2 having TTIs of 20 ms or greater are revised to correct TFIs by correction processing.

In this case, the actual state of TrCH multiplexing on the physical channel is as illustrated at the top of FIG. 4A. Owing to erroneous decoding of TFCI, however, the state of TrCH multiplexing appears as shown at the bottom of FIG. 4A. As a result, regardless of the fact that the transport channels (TrCHs) whose TTIs are 20 ms or greater could detect the transport formats (TTIs) correctly by correction processing, the data demultiplexing position shifts if the TFI of TrCH#3 whose transmission time interval (TTI) is 10 ms is erroneous. As a consequence, processing for decoding user data in all transport channels (TrCHs) fails.

Accordingly, the W-CDMA system is so defined that data is multiplexed in such a manner that the multiplexing of transport channels onto the physical channel is performed in order of decreasing transmission time interval (TTI). If this is done, transport channels (TrCHs) of 20-ms TTI or greater that are highly likely to be able to correct TFCI decoding error are mapped to the beginning of the physical channel. As a result, if the TrCH is one having a TTI of 20 ms or greater, the possibility that user data can be demultiplexed and decoded correctly in accordance with the corrected TFI is improved. Accordingly, even if decoding of TFCI is erroneous, TrCH#3 is mapped to an area DTX (dummy-data area), as shown in FIG. 4B, the TrCH#1 and TrCH#2 can acquire the user data correctly and the effects of erroneous TFCI decoding can be confined to the TrCH#3 whose TTI is 10 ms.

(B) Structure of Mobile Station

FIG. 5 is a block diagram illustrating the structure of a mobile station according to the present invention. Input units 51a to 51n are a voice input/output device and an image input/output device, etc., of a cellular telephone. Transmit data (voice code data, video code data, etc.) is output via internal voice and video codecs. In accordance with a command from a processor CPU (higher-order application) 53, a data selector 52 selectively inputs the transmit data, which enters via the voice or video codecs of the input/output units 51a to 51n, to transmit buffers of a channel codec 60.

Prior to communication, the processor CPU 53 receives transmit parameters from a base station (not shown) by negotiation and inputs these transmit parameters to the data selector 52 and channel codec 60. The communication parameters are the following parameters ① to ⑤, by way of example:

① TTI (Transmission Time Interval)

This is a parameter that specifies the transceive time interval (10, 20, 40, 80 ms) of a transport channel (TrCH). This parameter is conferred for every TrCH and is reported to each transmit terminal and receive terminal.

② Encoding method and encoding rate

This parameter specifies the encoding method applied to the transmit data of each TrCH as well as the encoding rate. For example, the parameter is one which indicates turbo encoding or convolutional (Viterbi) encoding. This param-eter is conferred for every TrCH and is reported to each transmit terminal and receive terminal.

③ TrCH multiplexing sequence

This parameter indicates the sequence in which the data of each TrCH is multiplexed in the multiplexer. The parameter is conferred for every TrCH and is reported to each transmit terminal and receive terminal.

④ Transport format of each TrCH

This parameter specifies the format (bit length per frame) that can be taken on by each transport channel (TrCH). In the example of the table shown in FIG. 6A, it is possible to specify the four patterns of 366 bits×0, 1, 2, 4 for TrCH#1 and the two patterns of 148 bits×0, 1 for TrCH#2, and each format of each TrCH is numbered starting at 0 from the beginning of the table. The numbering rule is the same for base stations and terminals, and the number is referred to as the TFI (Transport Format Indicator). This TFI table and the TFIs are reported to each transmit terminal and receive terminal.

⑤ Transceive TFCI

A base station takes the transport format of each TrCH into consideration to create a TFCI table indicating the status of TrCH multiplexing. The TFCI table thus created is reported to each terminal. In the example of FIG. 6B, there can be 4×2=8 combinations when each TrCH is multiplexed. Numbers of 0 to 7 therefore are assigned to respective ones of the combinations and are reported to each transmit terminal and receive terminal.

With reference again to FIG. 5, the channel codec 60, which executes encoding processing and decoding processing, includes transmit buffers $61_1$ to $61_4$, encoding processors $62_1$, to $62_4$, a multiplexer 63, a communication-parameter storage unit 64, a demultiplexer 65, decoding processors $66_1$ to $66_4$ and receive buffers $67_1$ to $67_4$.

In accordance with a command from processor CPU 53, the data selector 52 selectively inputs the transmit data, which enters from the input/output units, to the transmit buffers $61_1$ to $61_4$ as transmit data of transport channels TrCH#1 to TrCH#4 the transmission time intervals (TTIs) of which are 10, 20, 40 and 80 ms, respectively.

The transmit buffers $61_1$ to $61_4$ write the transmit data continuously to buffer memories every 10 ms and read out the transmit data at a stroke in burst fashion every 10 ms, 20 ms, 40 ms, 80 ms and input the read data to the encoding processors $62_1$ to $62_4$, which constitute the succeeding stage. The encoding processors $62_1$ to $62_4$ encode the transmit data of the respective lengths 10, 20, 40 and 80 ms in accordance with a specified encoding scheme (turbo or convolutional encoding) and input the encoded data to the multiplexer 63. More specifically, the encoding processor $62_1$ outputs encoded data E10 having a duration of 10 ms, the encoding processor $62_2$ outputs encoded data E20 having a duration of 20 ms, the encoding processor $62_3$ outputs encoded data E40 having a duration of 40 ms, and the encoding processor $62_4$ outputs encoded data E80 having a duration of 80 ms.

On the basis of a TFI (the bit length of one frame) specified by the processor CPU 53, the multiplexer 63 partitions encoded data that enters from the encoding processors $62_1$ to $62_4$, multiplexes the partitioned data of each encoded data in accordance with a multiplexing sequence similarly specified, creates one frame's worth of multiplexed data and transmits the multiplexed encoded data as in-phase component data.

A control signal generator 71 outputs control data such as a pilot PILO and TFCI as quadrature-component data at a fixed symbol speed. The TFCI specifies a combination of TFIs of the transport channels. The value of a TFCI is found by referring to the combination of TFIs of transport channels (TrCHs) specified by the processor CPU and to the TFCI table (FIG. 6B).

A QPSK spreader 81 subjects the input in-phase component (I-channel component) and quadrature component (Q-channel component) to spread-spectrum modulation using a predetermined spreading code, effects a digital-to-analog conversion and inputs the analog signal to a QPSK quadrature modulator 82. The latter subjects the I-channel signal and Q-channel signal to QPSK quadrature modulation and a radio transmitter 83 frequency-converts (IF→RF) the baseband signal from the quadrature modulator 82 to a high-frequency signal, performs high-frequency amplification and transmits the amplified signal from an antenna $ANT_T$.

A radio receiver 91 subjects a high-frequency signal received from an antenna $ANT_R$ to a frequency conversion (RF→IF conversion) to obtain a baseband signal, subjects the baseband signal to quadrature detection to generate in-phase component (I component) data and quadrature component (Q component) data, applies an analog-to-digital conversion and inputs the digital data to a despreading demodulator 92. The latter applies despread processing to the I- and Q-component signals using a code identical with that of the spreading code, demodulates (synchronously detects) the transmitted encoded data and inputs the data to the demultiplexer 65 of the channel codec 60.

The demultiplexer 65 stores the received demultiplexed data in a storage unit and decodes a TFCI frame by frame. Next, the demultiplexer 65 discriminates the TFIs on each transport channel frame by frame based upon the TFCI. Then, from the TFI table, the demultiplexer 65 thenceforth identifies the bit length per frame from the TFI data based upon the TFIs of each TrCH, demultiplexes the stored multiplexed data on a per-TrCH basis in accordance with the bit length and inputs the demultiplexed data to the decoding processors $66_1$ to $66_4$. The decoding processors $66_1$ to $66_4$ join and decode, in an amount equivalent to the transmission time interval (TTI), frame data that has been demultiplexed on a per-TrCH basis.

More specifically, the first decoding processor $66_1$ applies error correction processing to the encoded data of length 10 ms, decodes the original transmit data and inputs the decoded data to the succeeding receive buffer $67_1$ every 10 ms. The second decoding processor $66_2$ applies error correction processing to the encoded data of length 20 ms, decodes the original transmit data and inputs the decoded data to the succeeding receive buffer $67_2$ every 20 ms. The third decoding processor $66_3$ applies error correction processing to the encoded data of length 40 ms, decodes the original transmit data and inputs the decoded data to the succeeding receive buffer $67_3$ every 40 ms. The fourth decoding processor $66_4$ applies error correction processing to the encoded data of length 80 ms, decodes the original transmit data and inputs the decoded data to the succeeding receive buffer $67_4$ every 80 ms.

The receive buffers $67_1$ to $67_4$ write the decoded data to buffer memories in a single burst every 10 ms, 20 ms, 40 ms and 80 ms, read the decoded data out of the buffer memories continuously every 10 ms and input the data to the data selector 52. In accordance with a command from the processor CPU 53, the data selector 52 selectively inputs the decoded data, which enters from each of the receive buffers $67_1$ to $67_4$, to the input/output units 51a to 51n.

(C) Communication-parameter Delivery Sequence

Figure 7:
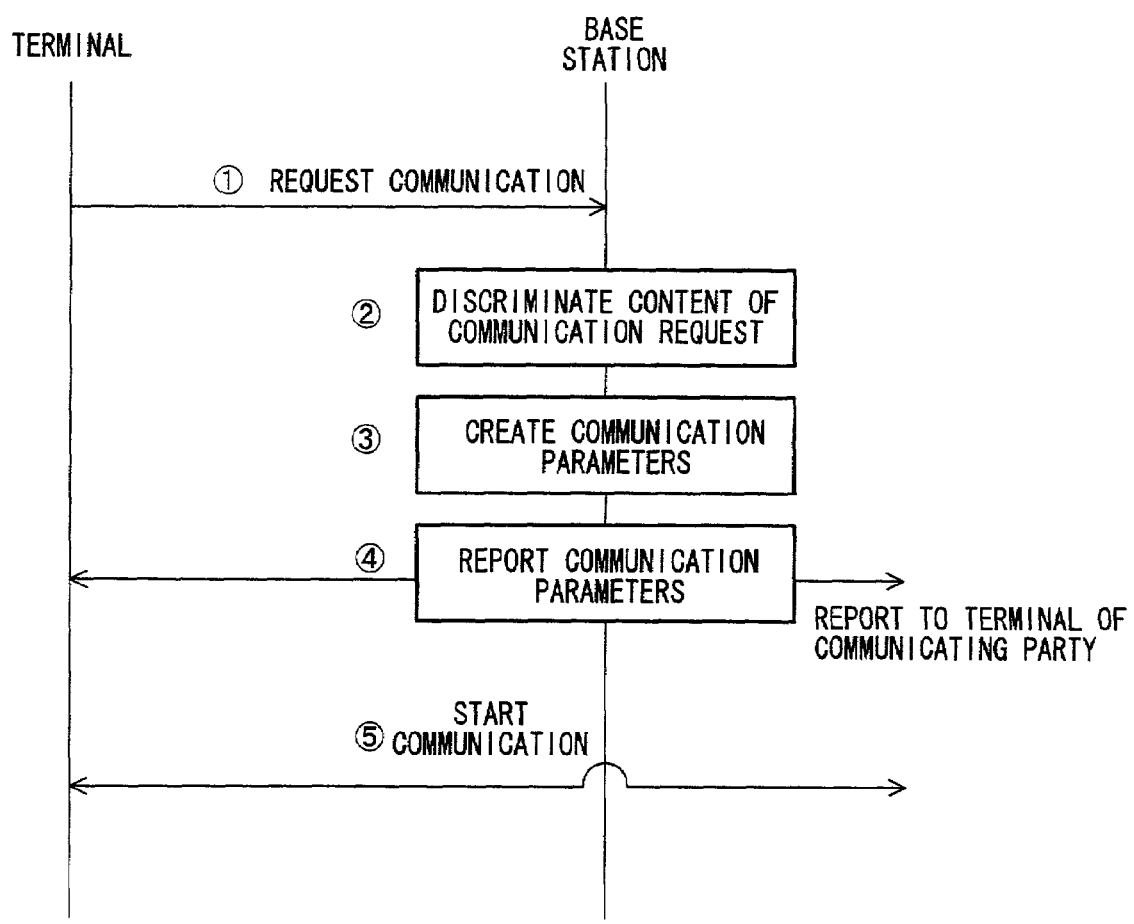
FIG. 7 shows a communication-parameter delivery sequence.

FIG. 7 is a diagram useful in describing a communication-parameter delivery sequence.

① An originating terminal issues a communication request to a base station when a call is made.

② Upon receiving the communication request from the terminal, the base station ascertains the content of the communication request. Specifically, the base station ascertains whether the request is a communication-start request, whether the content of communication is voice or a packet, and whether a service is to be added on or deleted.

③ Next, the base station creates communication parameters that are in line with the request from the terminal. For example, the base station creates such parameters as the transmission time interval (TTI), TrCH multiplexing sequence, TFCI table, transport format (TFI) and communication-start time. The parameters are created for both the originating terminal and the terminating terminal that is the object of communication.

④ The base station reports the created parameters to each of the terminals.

⑤ Each terminal that has received the parameters executes pre-processing necessary to perform communication and starts communicating with the terminal starting from the specified communication time.

(D) Overview of Processing by Channel Codec

Figure 8:
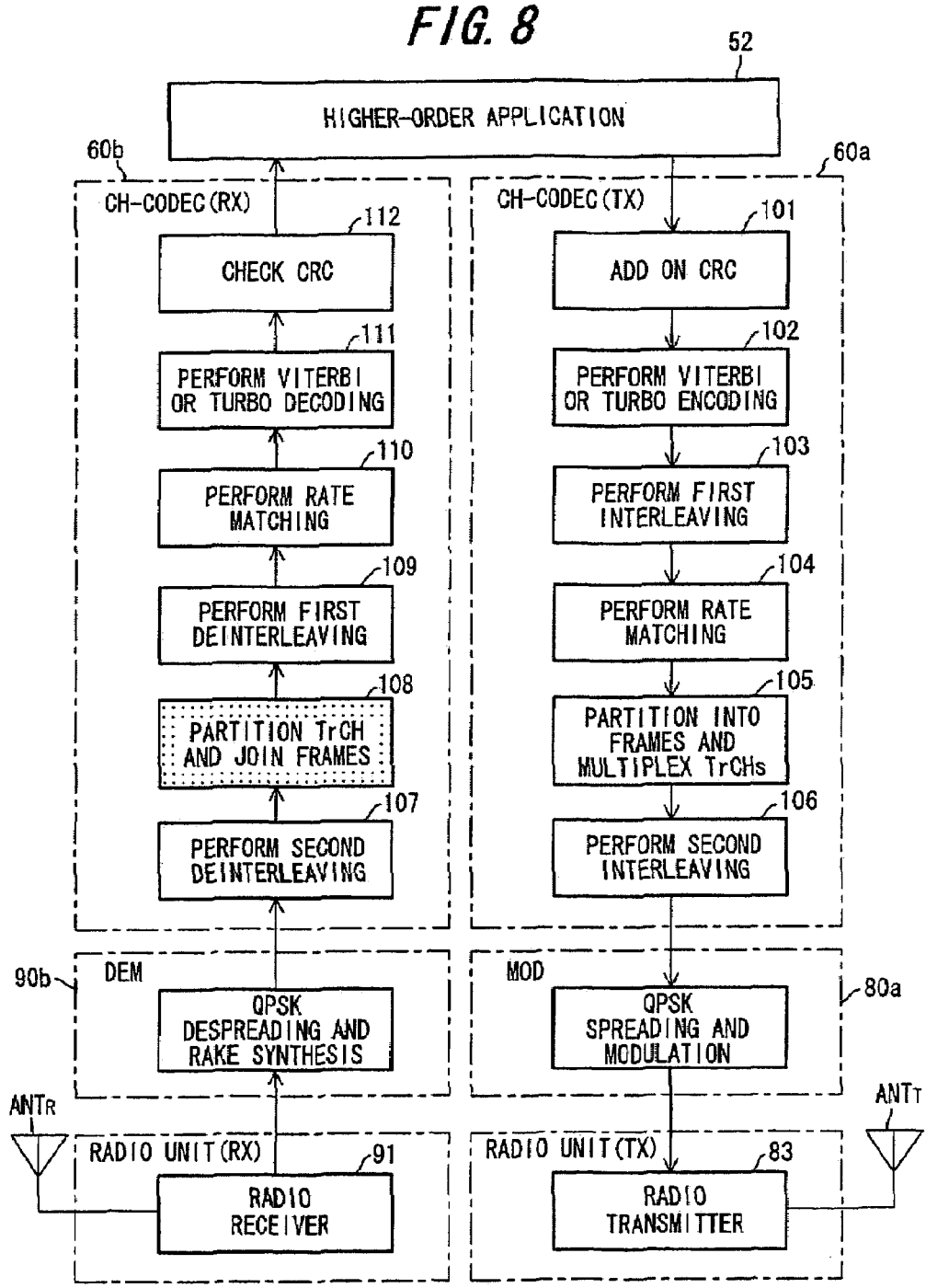
FIG. 8 is a diagram illustrating an overview of a W-CDMA channel codec.

FIG. 8 is a diagram useful in describing an overview of the functions of the channel codec 60 (FIG. 5) in the mobile station of a W-CDMA system. Data from the data selector 52 on the side of the higher-order application enters a channel codec 60a on the transmitting side. The channel codec 60a on the transmitting side adds a CRC bit onto the data (step 101) and then inputs the data to a convolutional encoder or turbo encoder depending upon the type of data, thereby encoding the data (step 102). The channel codec 60a then subjects the encoded data to first interleave processing (step 103) and subsequently performs a data compression/decompression operation in a rate matching unit (step 104). The channel codec 60a partitions the rate-matched encoded data at the transmission time interval (TTI), multiplexes the date in a specified order with the encoded data of other transport channels (TrCHs) and sends the multiplexed data to the physical channel (step 105). The channel codec 60a subjects this multiplexed data to second interleave processing and transfers the resulting data to a MOD 80a (step 106). The latter executes QPSK spreading and QPSK modulation, and a radio unit (TX) effects a conversion to an RF signal and transmits the RF signal from an antenna.

At reception, a radio unit (RX) makes a conversion from an RF signal to a baseband signal, and a DEM unit 90b performs QPSK demodulation and QPSK despreading/RAKE synthesis to thereby demodulate the receive data. The demodulated data is input to a channel codec 60b on the receiving side. The channel codec 60b on the receiving side subjects the received demultiplexed data to second deinterleave processing (step 107), then demultiplexes the multiplexed data on a per-transport-channel basis and joins the demultiplexed data on a per-transport-channel basis (step 108). The channel codec 60b on the receiving side thenceforth subjects the receive data to first deinterleave processing on a per-transport-channel basis (step 109) and subsequently performs a data compression/decompression operation in a rate matching unit (step 110). The channel codec 60b on the receiving side then subjects the rate-matched data (encoded data) to convolutional decoding processing or turbo decoding processing to thereby decode the data (step 111), subjects the decoded data to a CRC check (step 112) and sends the results to the side of the higher-order application.

The present invention is applicable to TrCH partitioning processing/frame joining processing of the channel codec 60b on the receiving side and processing executed before and after this processing.

(E) Structure of Demultiplexer of the Invention

Figure 9:
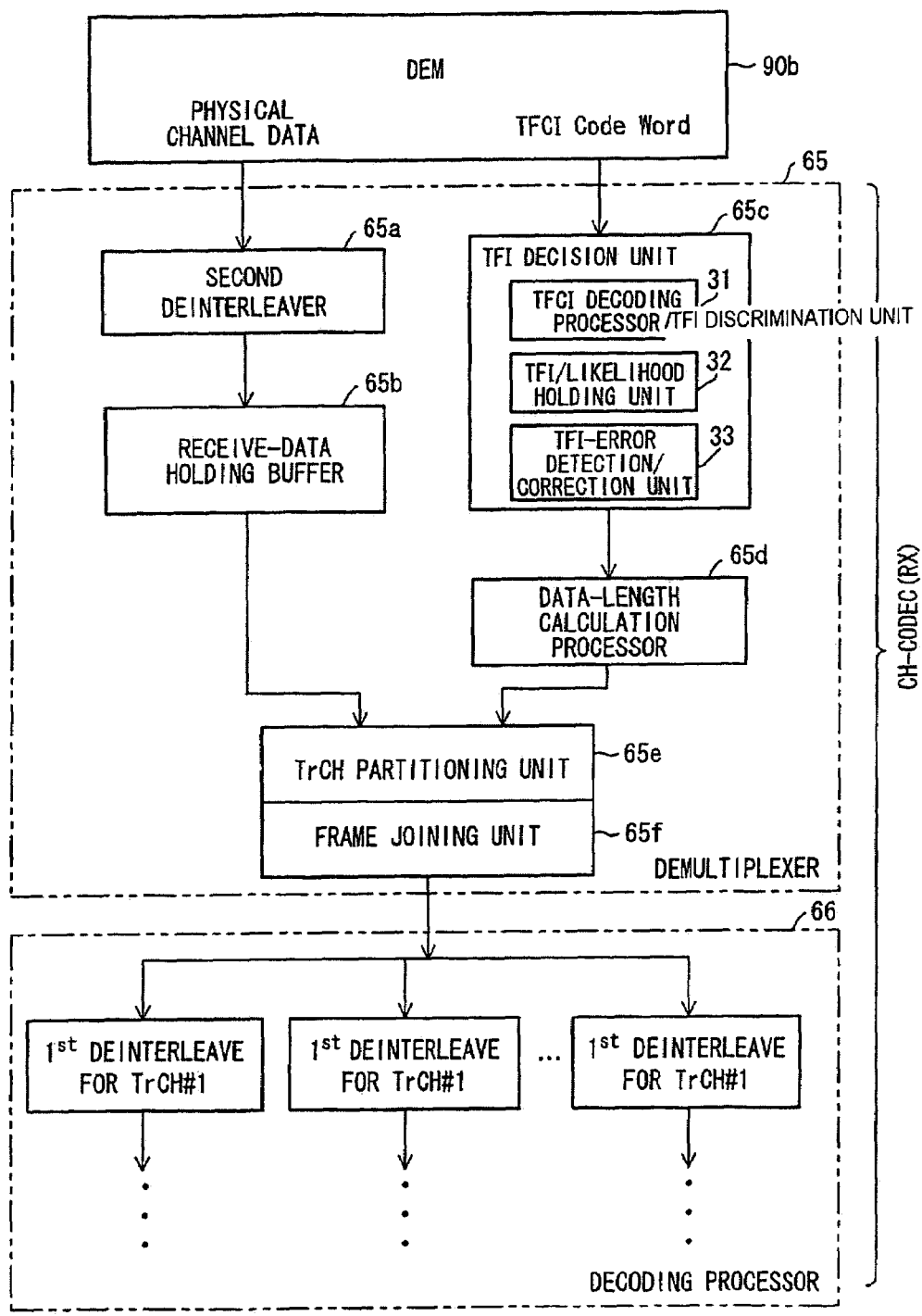
FIG. 9 is a diagram showing the structure of a demultiplexer according to the present invention.

FIG. 9 is a diagram showing the structure of the demultiplexer 65 in a receive codec according to the present invention.

The demultiplexer 65 in the codec on the receiving side receives physical-channel data (multiplexed data) and a TFCI code word from the DEM 90b. A second deinterleaver 65a subjects the received physical-channel data to second deinterleave processing and retains the result in a receive-data holding buffer 65b. The buffer 65b requires an area capable of holding data at least in an amount commensurate with the longest transmission time interval (TTI) (=80 ms). A TFCI decoding processor/TFI discrimination unit 31 of a TFI decision unit 65c finds a TFCI by decoding, frame by frame, the TFCI code word received at the same time as the multiplexed data, refers to a TFCI table and detects the TFIs of each of the transport channels (TrCHs) frame by frame. A TFI/likelihood holding unit 32 holds the TFI of every frame of each TrCH and likelihood calculated at the time of TFCI decoding and uses these in TFI error detection and correction processing. This data also is necessary to be retained in an amount commensurate with the longest transmission time interval (TTI).

If a TFI-error detection/correction unit 33 detects that a TFI is erroneous in a certain frame, then the unit reports this TFI to a data-length calculation processor 65d. If there is no error, the TFI-error detection/correction unit 33 notifies the data-length calculation processor 65d of the TFI obtained based upon the TFCI found from TFCI decoding.

On the basis of the TFI reported to it, the data-length calculation processor 65d refers to the TFI table and calculates the data length per frame of each TrCH (such as the partitioned data length on the physical channel). On the basis of the result of data-length calculation, a TrCH partitioning unit 65e partitions, on a per-TrCH basis, the physical-channel data (multiplexed data). A frame joining unit 65f joins the data, which has been partitioned on a per-TrCH basis, in an amount commensurate with the transmission time interval (TTI), outputs the joined data to a decoding processor 66 and executes first deinterleave processing for every TrCH.

The above-described second deinterleaver 65a, TFI decision unit 65c, data-length calculation processor 65d, TrCH partitioning unit 65e and frame joining unit 65f can be implemented by special-purpose hardware circuits or by software processing by a CPU or DSP, etc.

(F) First Embodiment

Figure 10:
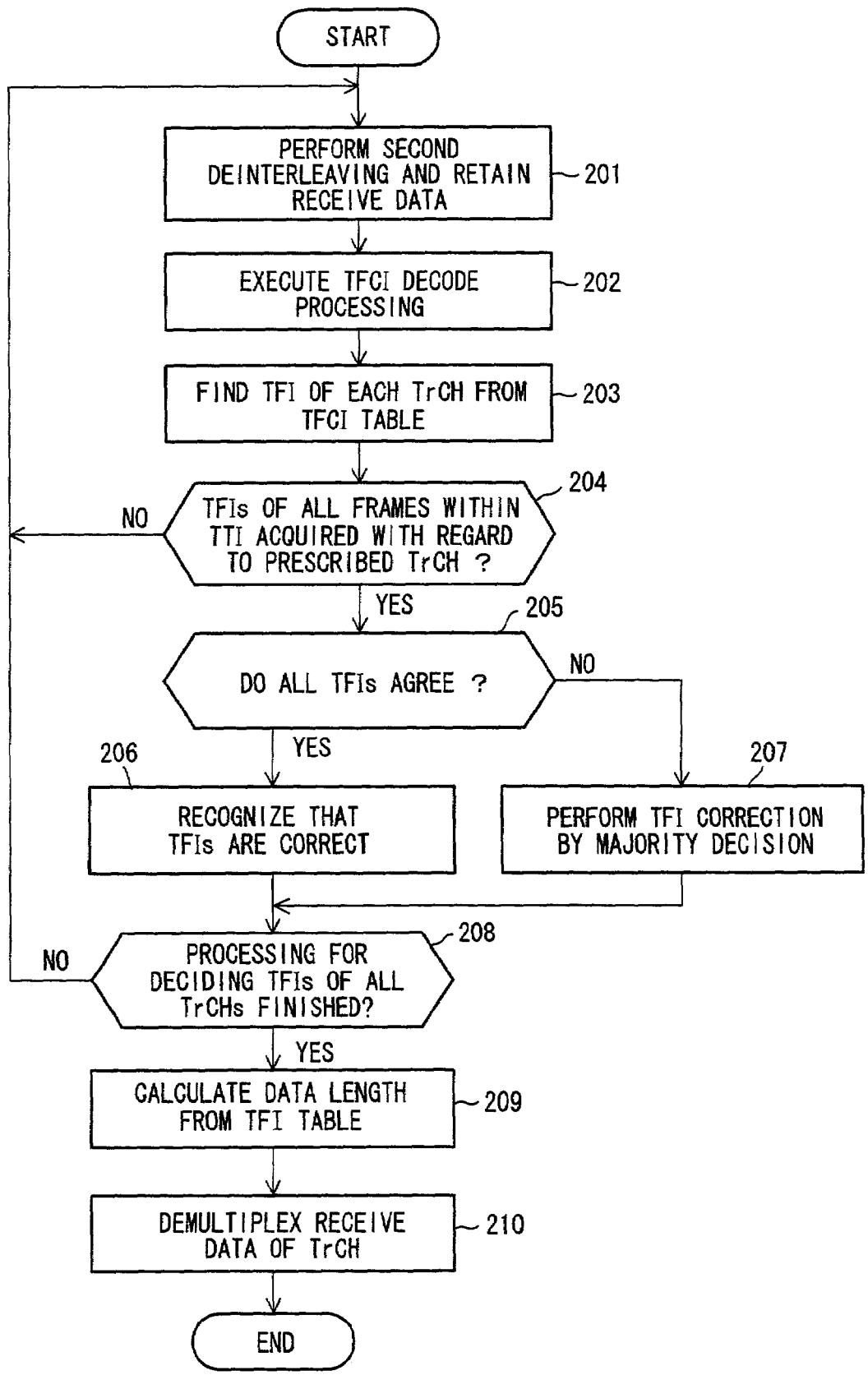
FIG. 10 is a flowchart of demultiplex processing according to the first embodiment.

FIG. 10 is a flowchart of processing for demultiplexing multiplexed data according to a first embodiment of the present invention.

The demultiplexer 65 subjects multiplexed data received from the DEM 90b to deinterleave processing in the second deinterleaver 65a and retains the processed data in the receive-data holding buffer 65b (step 201). In parallel with this, the TFI decision unit 65c decodes the TFCI frame by frame (step 202), refers to the TFCI table based upon the TFCI of every frame, finds the transport formats (TFIs) of each TrCH frame by frame and retains these (step 203). Next, with regard to each TrCH for which the transmission time interval (TTI) is 20 ms or greater, the demultiplexer 65 checks to see whether the TFIs of all frames within this transmission time interval (TTI) have been acquired (step 204). If acquisition has not been completed, processing from step 201 onward is repeated. If a TrCH for which acquisition has been completed exists, a check is made with regard to this TrCH to determine whether the TFIs of all frames within the transmission time interval (TTI) agree (step 205). If all of the TFIs agree, it is judged that the TFIs are not erroneous (step 206). If even one TFI differs (see FIG. 1), it is construed that there is a TFI error somewhere and the transport formats (TFIs) in the above-mentioned transmission time interval (TTI) are decided by majority rule (step 207).

This is followed by determining whether the processing for deciding the TFIs of all transport channels (TrCHs) is finished (step 208). If the answer is "NO", processing from step 201 onward is repeated. If the processing for deciding the TFIs of all TrCHs is finished, on the other hand, the data-length calculation processor 65d refers to the TFI table and calculates the bit length of every frame in each of the transport channels (step 209).

On the basis of the bit length and multiplexing sequence, the TrCH partitioning unit 65e demultiplexes the multiplexed data, which has been stored in the buffer 65b, into frame data for every transport channel, and the frame joining unit 65f joins the frame data, which has been demultiplexed on a per-transport-channel basis, in an amount commensurate with the transmission time interval and inputs the results to the decoding processor 66 (step 210).

(G) Second Embodiment

Figure 11:
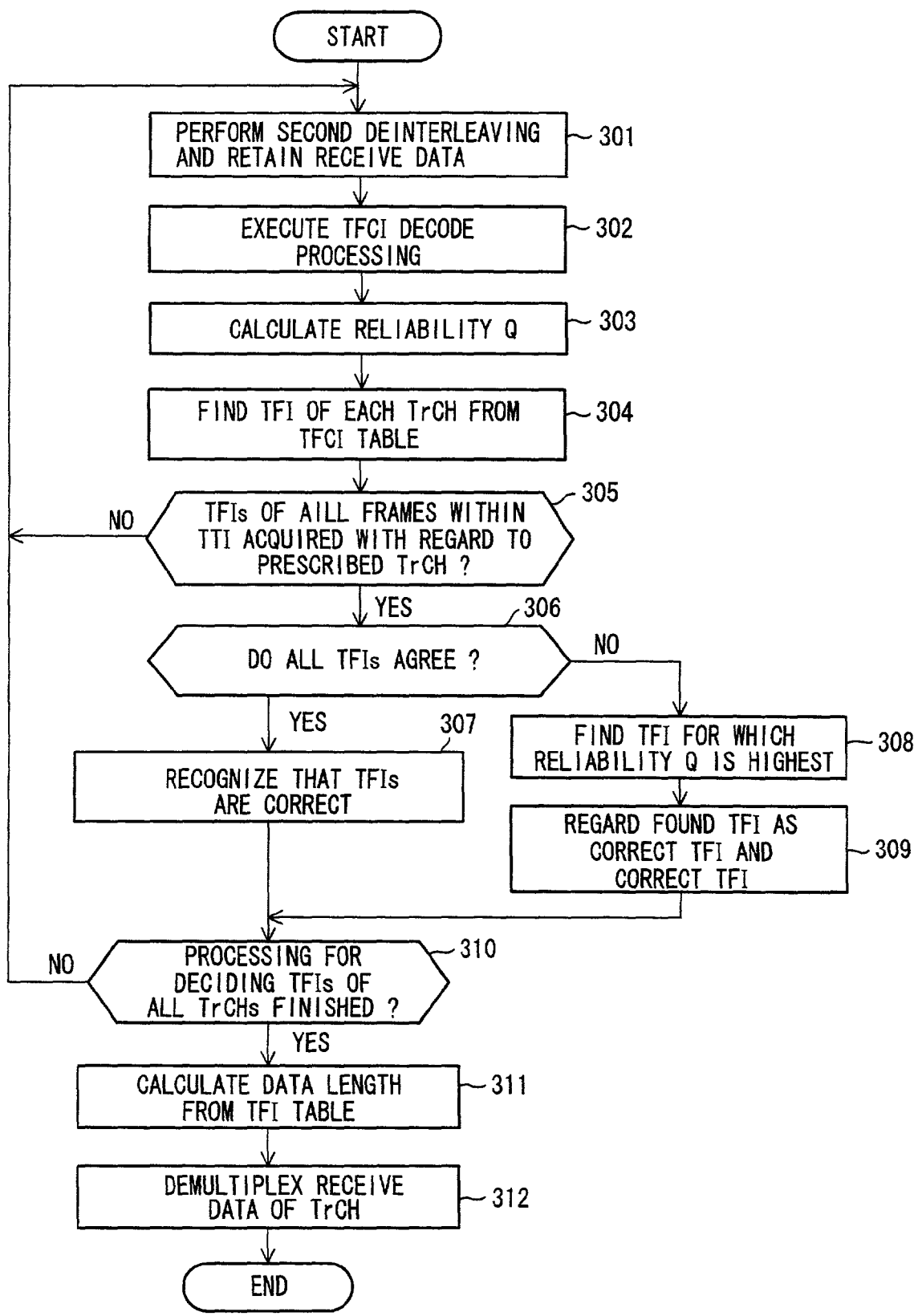
FIG. 11 is a flowchart of demultiplex processing according to the second embodiment.

FIG. 11 is a flowchart of processing for demultiplexing multiplexed data according to a second embodiment of the present invention.

The demultiplexer 65 subjects multiplexed data received from the DEM 90b to deinterleave processing in the second deinterleaver 65a and retains the processed data in the receive-data holding buffer 65b (step 301). In parallel with this, the TFI decision unit 65c decodes the TFCI frame by frame. For example, the TFCI candidate having the highest likelihood among the likelihoods of TFCI candidates calculated at the time of TFCI decoding is decided upon as the TFCI in the frame of interest (step 302). The reliability Q (see FIG. 2) is calculated in accordance with Equation (5) frame by frame using the likelihood of each TFCI candidate and the reliability Q is retained (step 303).

Next, the demultiplexer 65 refers to the TFCI table based upon the TFCI obtained at step 302, finds the transport formats (TFIs) of each TrCH frame by frame and retains these (step 304). Next, with regard to each TrCH for which the transmission time interval (TTI) is 20 ms or greater, the demultiplexer 65 checks to see whether the TFIs of all frames within this transmission time interval (TTI) have been acquired (step 305). If acquisition has not been completed, processing from step 301 onward is repeated. If a TrCH for which acquisition has been completed exists, a check is made with regard to this TrCH to determine whether the TFIs of all frames within the transmission time interval (TTI) agree (step 306).

If all of the TFIs agree, it is judged that the TFIs are not erroneous (step 307). If even one TFI differs, it is construed that there is a TFI error somewhere and the transport formats (TFIs) in the above-mentioned transmission time interval (TTI) are decided using the reliability Q (FIG. 2) (steps 308, 309). More specifically, the transport format (TFI) for which the reliability Q is highest in all frames in the transmission time interval (TTI) of interest is obtained as the transport format (TFI) in the above-mentioned transmission time interval (TTI) of interest.

This is followed by determining whether the processing for deciding the TFIs of all transport channels (TrCHs) is finished (step 310). If the answer is "NO", processing from step 301 onward is repeated. If the processing for deciding the TFIs of all TrCHs is finished, on the other hand, the data-length calculation processor 65*d* refers to the TFI table and calculates the bit length of every frame in each of the transport channels (step 311).

On the basis of the bit length and multiplexing sequence, the TrCH partitioning unit 65*e* demultiplexes the multiplexed data, which has been stored in the buffer 65*b*, into frame data for every transport channel, and the frame joining unit 65*f* joins the frame data, which has been demultiplexed on a per-transport-channel basis, in an amount commensurate with the transmission time interval and inputs the results to the decoding processor 66 (step 312).

(H) Modification of Second Embodiment

Figure 12:
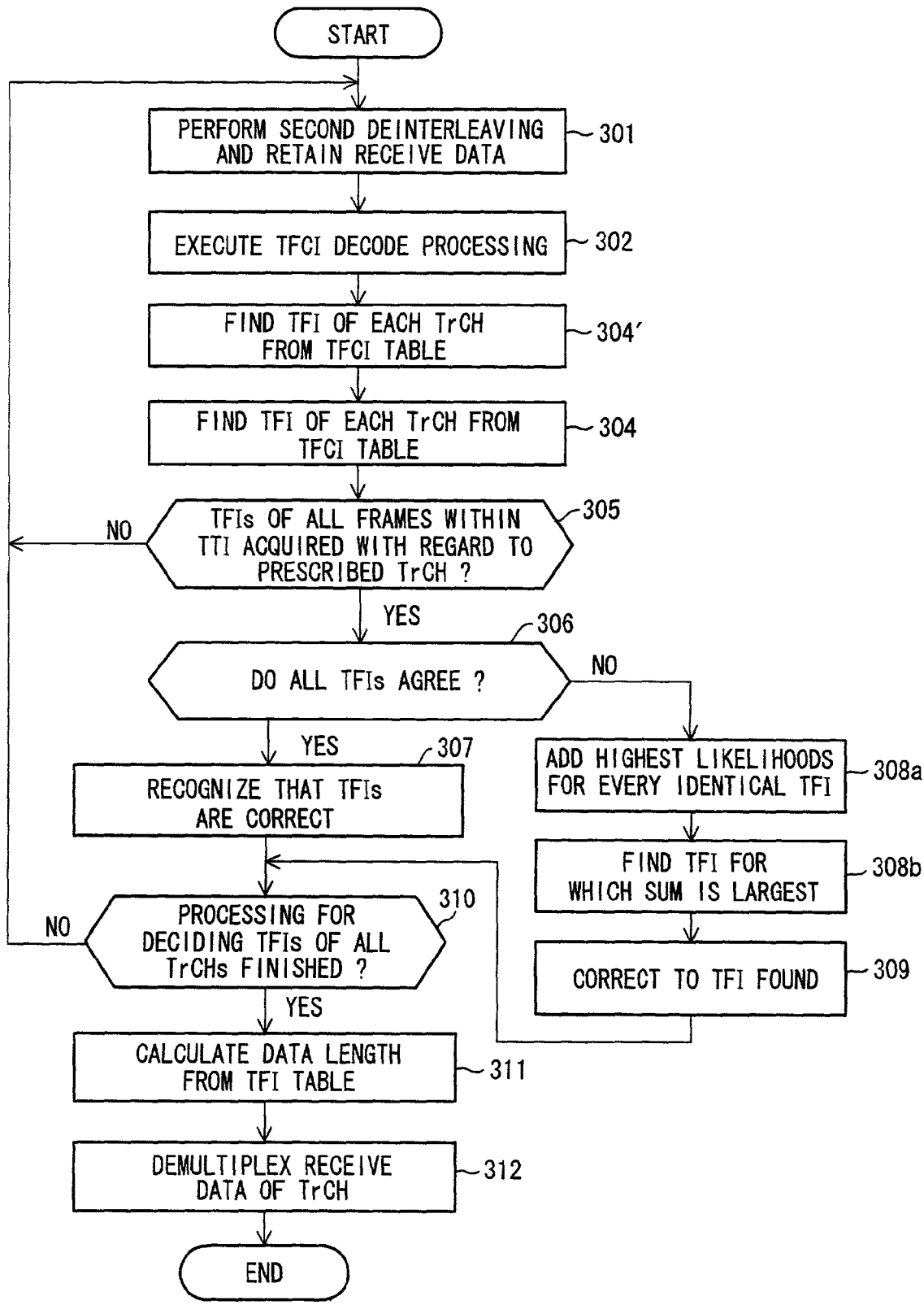
FIG. 12 is another flowchart of demultiplex processing according to the second embodiment.

FIG. 12 shows a modification of a flowchart of processing for demultiplexing multiplexed data according to the second embodiment. Steps identical with those shown in FIG. 11 are designated by like step numbers. This modification differs from the second embodiment in that a TFI is corrected by inferring the correct TFI using likelihood instead of calculating the reliability Q.

To accomplish this, the TFI decision unit 65*c* decides that the TFCI candidate having the highest likelihood among the likelihoods of TFCI candidates calculated at the time of TFCI decoding is the TFCI in the frame of interest (step 302) and stores this highest likelihood frame by frame (FIG. 2; step 304'). When the TFIs of all frames within a prescribed transmission time interval (TTI)) do not agree ("NO" at step 306), the TFI decision unit 65*c* totals the likelihoods of all identical TFIs (step 308*a*) and decides that the TFI for which the total is largest is the transport format (TFI) in the transmission time interval (TTI) of interest (step 308*b*). Next, the TFI found is regarded as the correct TFI, the TFI in the transmission time interval (TTI) of interest is corrected and then processing identical with that of the second embodiment is executed.

(I) Third Embodiment

Figure 13:
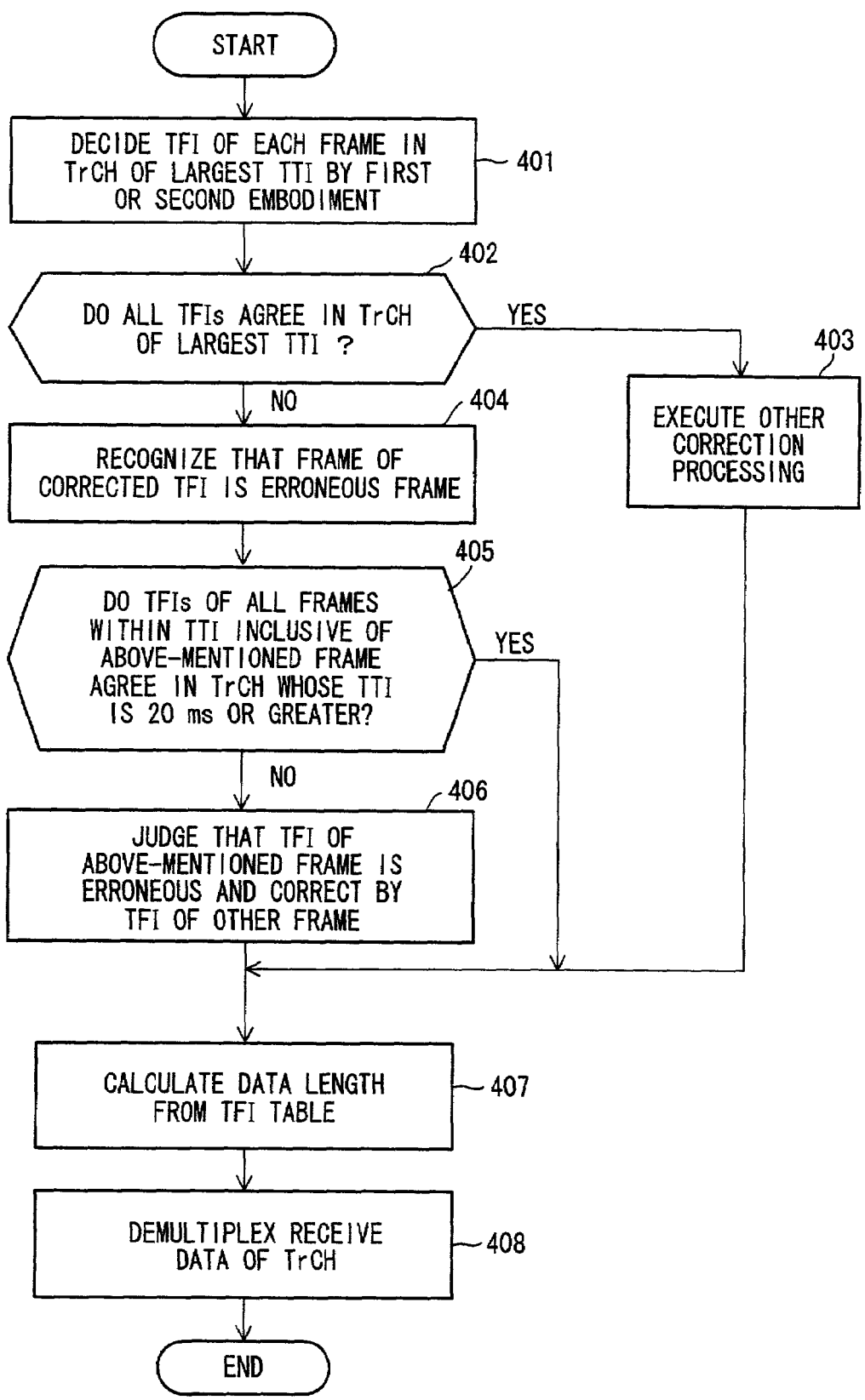
FIG. 13 is a flowchart of processing for demultiplexing multiplexed data according to the third embodiment.

FIG. 13 is a flowchart of processing for demultiplexing multiplexed data according to a third embodiment of the present invention.

The TFI of each frame in the TrCH having the largest transmission time interval (TTI) is decided in accordance with the first or second embodiment (step 401). Next, the TFI decision unit 65*c* checks to see whether all TFIs in the TrCH of the largest transmission time interval (TTI) agree (step 402). If all TFIs agree, then other TFI correction processing is executed with regard to a TrCH other than that having the largest transmission time interval (TTI) (step 403).

If the decision rendered at step 402 is that all TFIs do not agree, however, then the TFI decision unit 65*c* recognizes that there was an error in the frame (see the third frame in FIG. 3) of the TFI corrected at step 401 and judges that the TFIs of this frame in the other transport channels (TrCHs) also have a low reliability with regard to the correctness thereof (step 404).

Next, with regard to a TrCH for which the transmission time interval (TTI) is 20 ms or greater, the TFI decision unit 65*c* checks to see whether the TFIs of all frames within this transmission time interval (TTI) inclusive of the erroneous frame agree (step 405). If all TFIs agree, it is judged that this TrCH is free of erroneous TFIs. If the TFIs do not agree, however, it is judged that the TFI (TFI=1 in FIG. 3) in the erroneous frame is erroneous and this is corrected to the TFI (=2) of the other frame (step 406).

If the processing for deciding TFI in all transport channels (TrCHs) is finished, the data-length calculation processor 65*d* refers to the TFI table and calculates the bit length of every frame of each transport channel (TrCH) (step 407). On the basis of the bit length and multiplexing sequence, the TrCH partitioning unit 65*e* demultiplexes the multiplexed data, which has been stored in the buffer 65*b*, into frame data for every transport channel, and the frame joining unit 65*f* joins the frame data, which has been demultiplexed on a per-transport-channel basis, in an amount commensurate with the transmission time interval and inputs the results to the decoding processor 66 (step 408).

Figure 14:
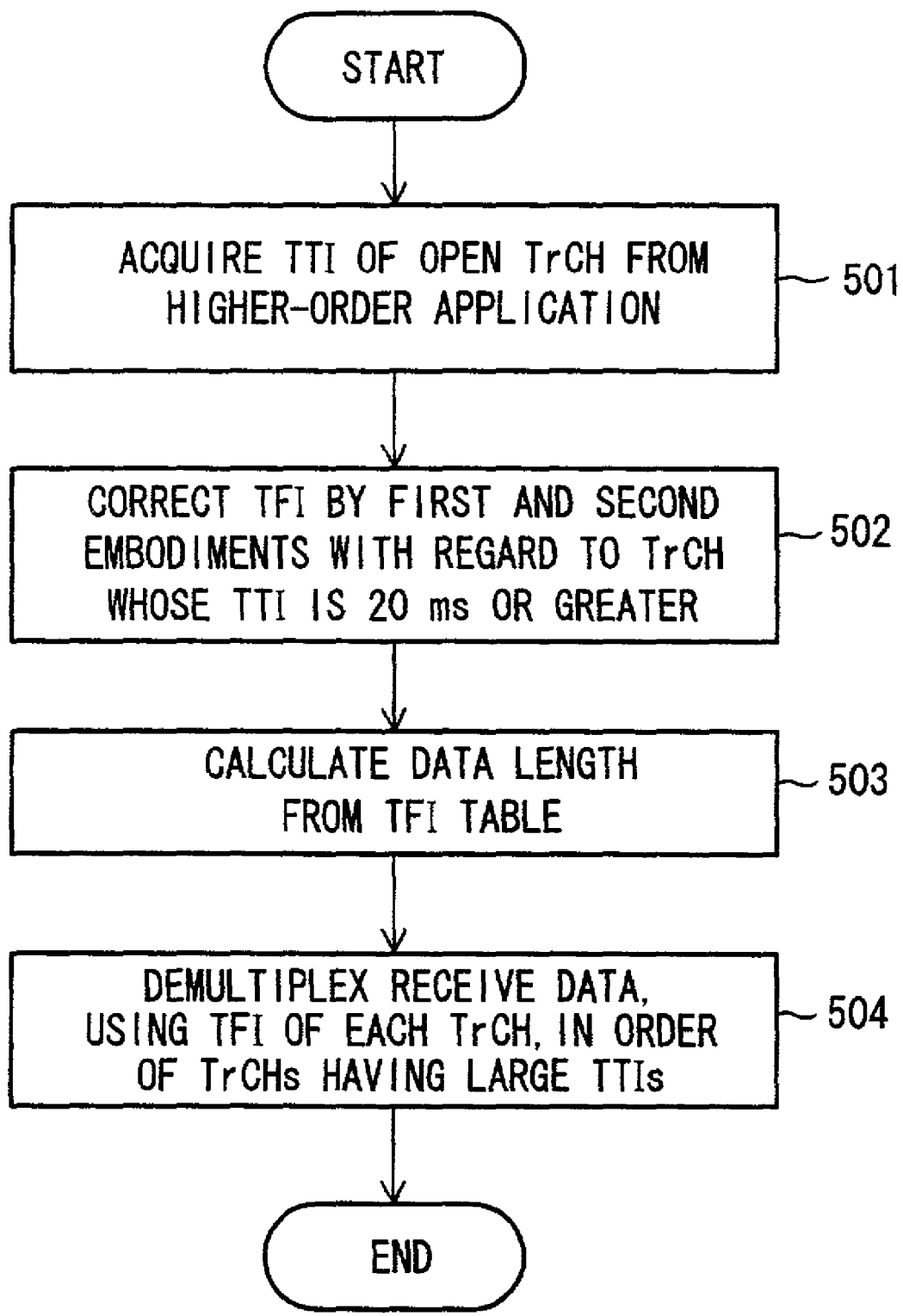
FIG. 14 is a flowchart of processing for demultiplexing multiplexed data according to a fourth embodiment of the present invention.

(J) Fourth Embodiment (a) Processing for Demultiplexing Multiplexed Data in Receiving Apparatus FIG. 14 is a flowchart of processing for demultiplexing multiplexed data according to a fourth embodiment of the present invention.

The transmission time interval (TTI) of the open transport channel (TrCH) is acquired from the higher-order application (CPU) (step 501). The transport format (TFI) of a TrCH for which the transmission time interval (TTI) is 20 ms or greater is corrected in accordance with the first and second embodiments (step 502).

The data-length calculation processor 65*d* thenceforth refers to the TFI table using the corrected TFI and finds the frame bit length of each TrCH frame by frame (step 503). The TrCH partitioning unit 65*e* judges that the frame data of the TrCH has been multiplexed in the order reported by the higher-order application, i.e., in order of decreasing transmission time interval, and demultiplexes, frame by frame in this order, the data of the TrCH in increments of the bit length found at step S503. The frame joining unit 65*f* joins the frame data, which has been demultiplexed on a per-transport-channel basis, in an amount commensurate with the transmission time interval and inputs the joined data to the decoding processor 66 (step 504).

The foregoing is processing for demultiplexing multiplexed data on the receiving side. On the transmitting side the transmit data of each transport channel (TrCH) is multiplexed and transmitted in order of decreasing transmission time interval (TTI).

(b) Processing for Multiplexing and Transmitting Data on Transmitting Side

Figure 15:
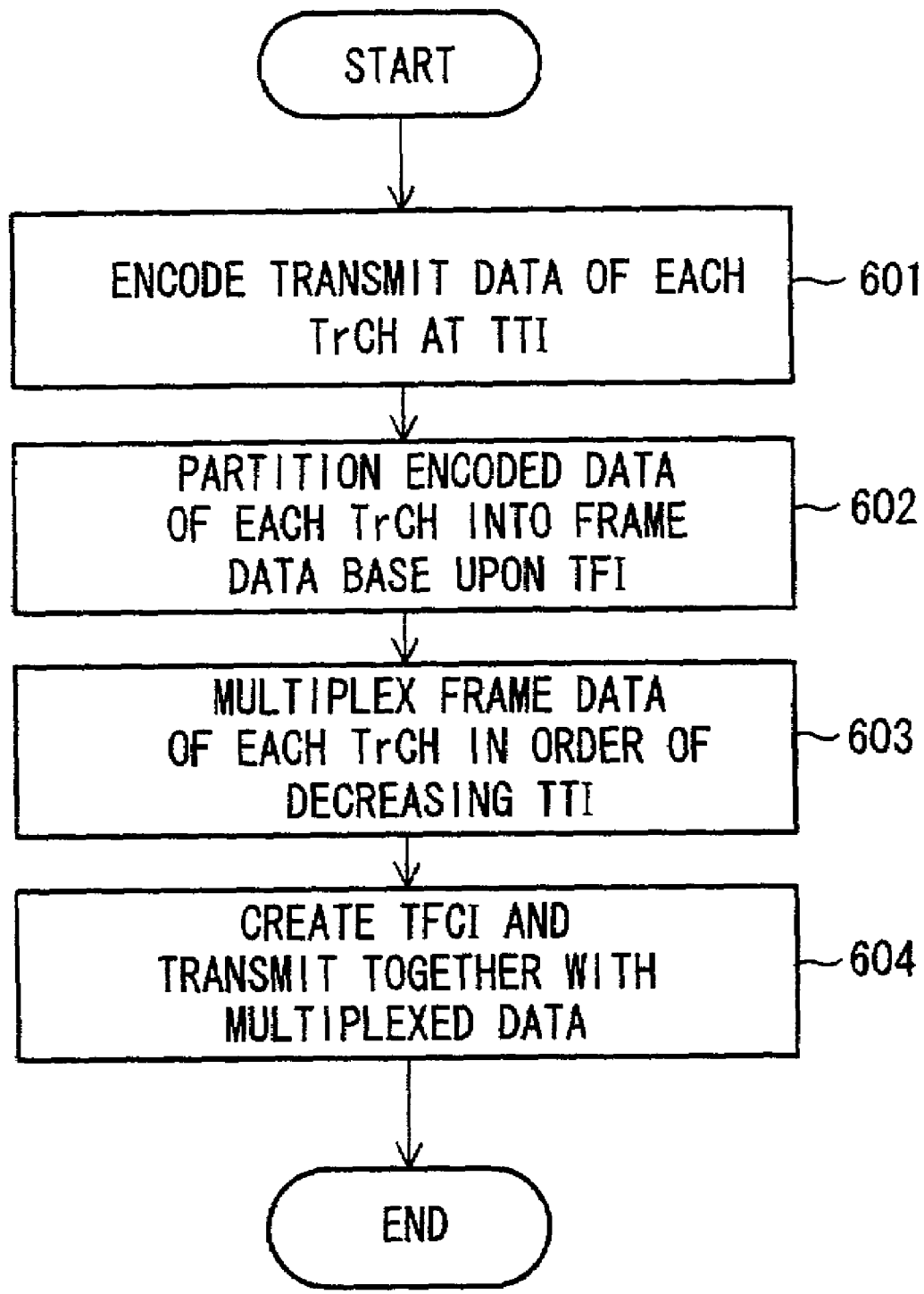
FIG. 15 is a flowchart of multiplexing and transmission processing according to the fourth embodiment.

FIG. 15 is a flowchart of processing executed by the channel codec 60*a* (FIG. 8) on the transmitting side for multiplexing and transmitting data.

The channel codec 60*a* encodes transmit data of each transport channel (TrCH) at a prescribed transmission time interval (TTI) (step 601) and partitions the encoded data at the frame period based upon the TFI to obtain frame data having a prescribed bit length (step 602). Next, the channel codec 60*a* multiplexes the frame data of each transport channel (TrCH) in the order reported from the higher-order application, i.e., in order of decreasing transmission time interval (TTI) (step 603), decides combination information TFCI of TFIs of each TrCH and transmits TFCI as control data together with the multiplexed data (step 604).

(c) Influence of Multiplexing Sequence

Assume that open transport channels (TrCH) include a TrCH having a TTI of 10 ms and that the frame data of the TrCH having the TTI of 10 ms has been mapped to the physical channel ahead of frame data of transport channels (TrCH) having TTIs of 20 ms or greater. Consider as an example a case where the transmission time intervals (TTIs) of TrCH#3, TrCH#1 and TrCH#2 are 10 ms, 40 ms and 20 ms, respectively.

Figure 16A:
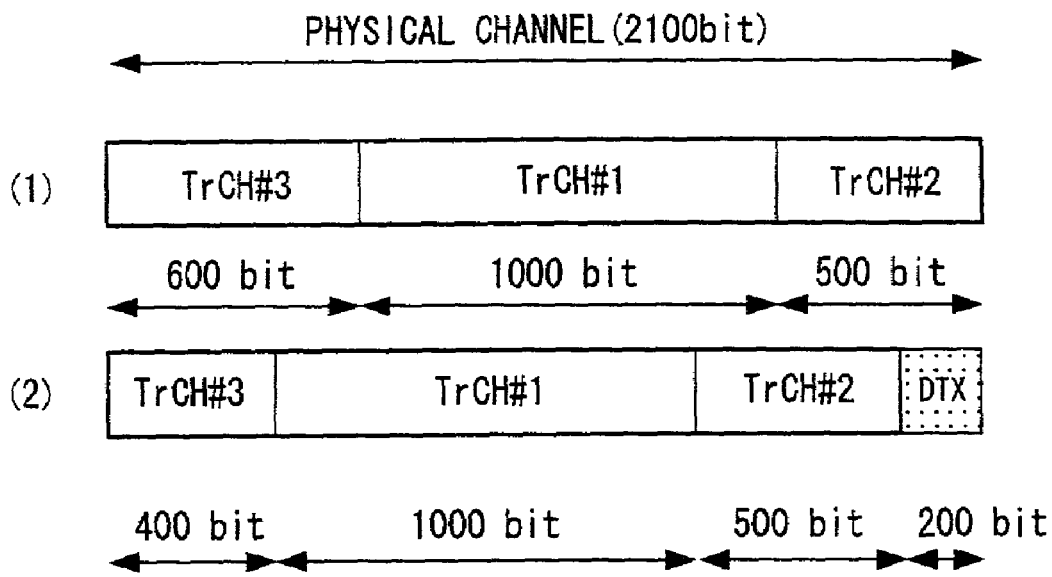
FIGS. 16A, 16B are diagrams useful in describing the fourth embodiment.

Let the TrCH multiplexing sequence be TrCH#3, TrCH#1, TrCH#2 starting from the beginning of the physical channel. Assume that data multiplexed as shown at (1) in FIG. 16A has been received in a certain frame. Assume, however, that because TFCI is erroneous, only TrCH#3 whose TTI is 10 ms could not detect TFI correctly although TrCH#1, TrCH#2 for which TTI is 20 ms or greater could detect TFI correctly by correction processing. The status of processing judged from the detected TFIs in this case is as shown at (2) in FIG. 16A. Here DTX is dummy data for the purpose of making the sizes of physical-channel data agree. If the multiplexed data is partitioned every TrCH under these conditions, the data acquisition position of TrCH3 will be erroneous. As a consequence, the data of TrCH#1, TrCH#2 whose data sizes could be recognized correctly also undergoes erroneous decoding.

Accordingly, if the W-CDMA system is so defined that data is multiplexed in such a manner that the multiplexing of TrCH onto the physical channel is performed in order of decreasing TTI, frame data of TrCH that is highly likely to be able to correct TFCI decoding error will be mapped to the beginning of the physical channel. As a result, if the TrCH is one having a TTI of 20 ms or greater, the possibility that user data can be demultiplexed and decoded correctly in accordance with the result of TFI correction is improved.

Figure 16B:
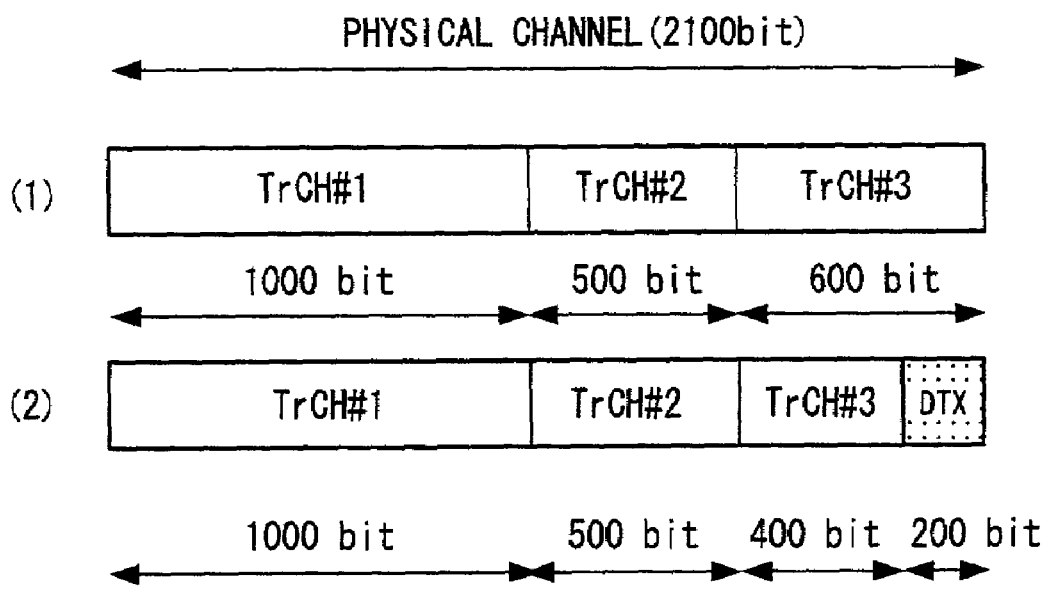

Assume that the multiplexing sequence of TrCH is TrCH#1 (TTI 40 ms), TrCH#2 (TTI 20 ms), TrCH#3 (TTI 10 ms) and that data multiplexed as shown at (1) in FIG. 16B has been received. Assume, however, that because TFCI is erroneous, TrCH#3 whose TTI is 10 ms could not detect TFI correctly although TrCH#1, TrCH#2 for which TTI is 20 ms or greater could detect TFI correctly by correction processing. The status of processing judged from the detected TFIs in this case is as shown at (2) in FIG. 16B. Here DTX is dummy data for the purpose of making the sizes of physical-channel data agree. In this case, TrCH#1, TrCH#2 can demultiplex and acquire user data correctly and the influence of TFCI decoding error can be confined to the TrCH#3 whose TTI is 10 ms.

If the order of multiplexing is so arranged that the long TTI takes the lead, excellent effects are obtained; hence, multiplexing need not necessarily be performed in order of decreasing TTI length. However, it is preferred that the TrCH of smallest length be multiplexed at the very end. In other words, conversely stated, excellent results will be obtained if the order of multiplexing is so arranged that the short TTI comes at the end.

(d) Method of Deciding TrCH Multiplexing Sequence

Figure 17:
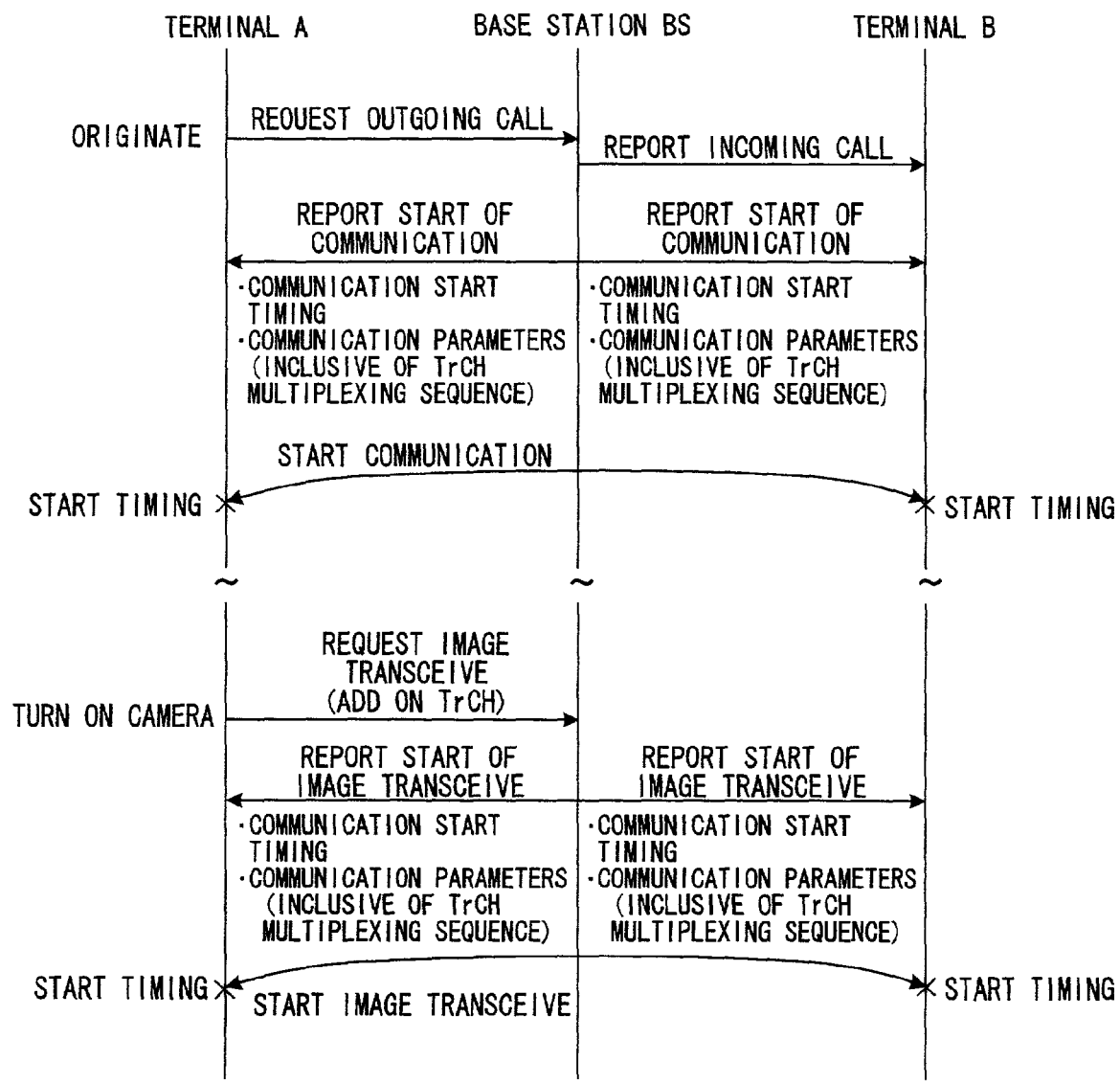
FIG. 17 illustrates an example of notification of a TrCH multiplexing sequence.
Figure 18:
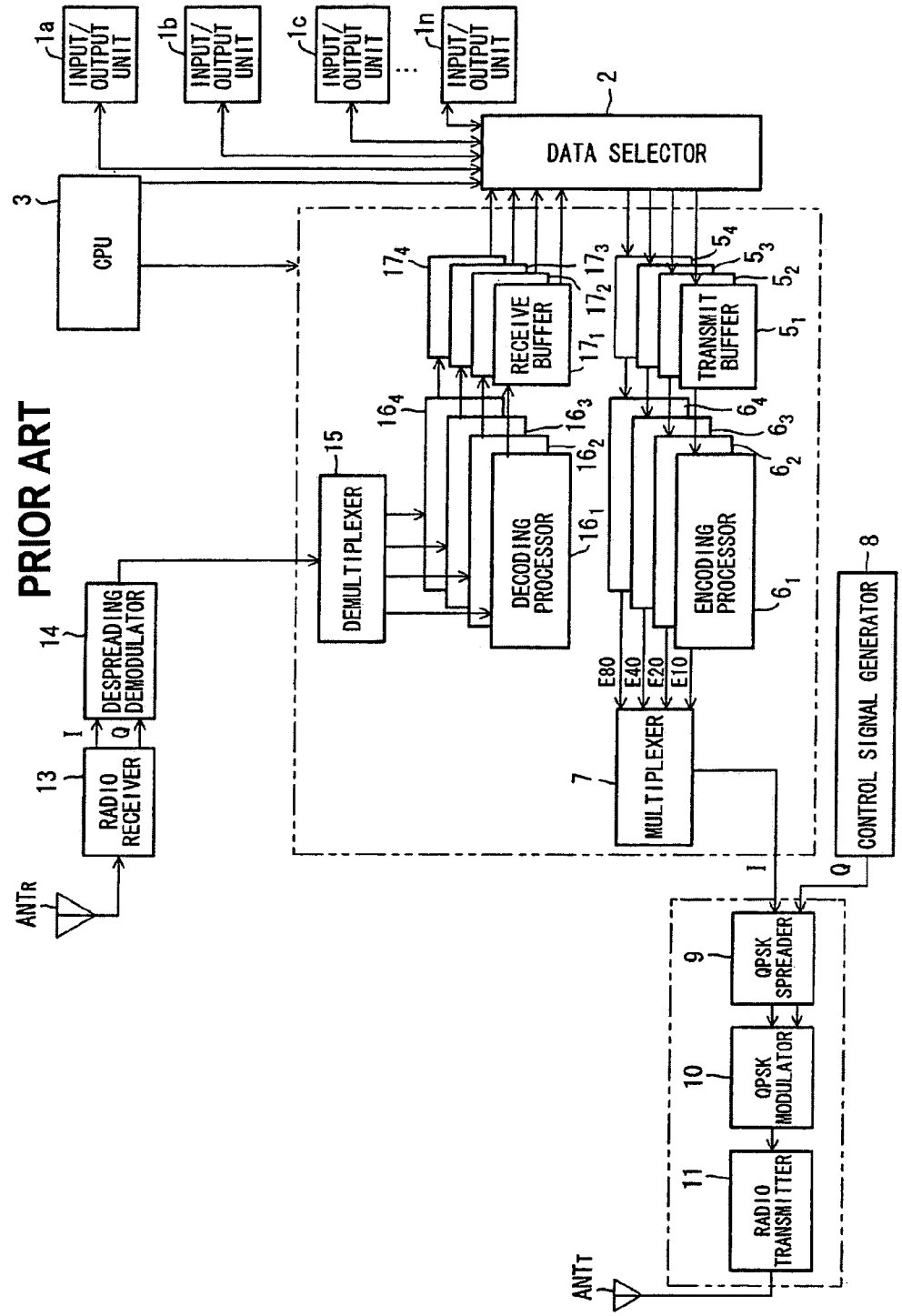
FIG. 18 is a block diagram illustrating the structure of a mobile station according to the prior art.
Figure 19:
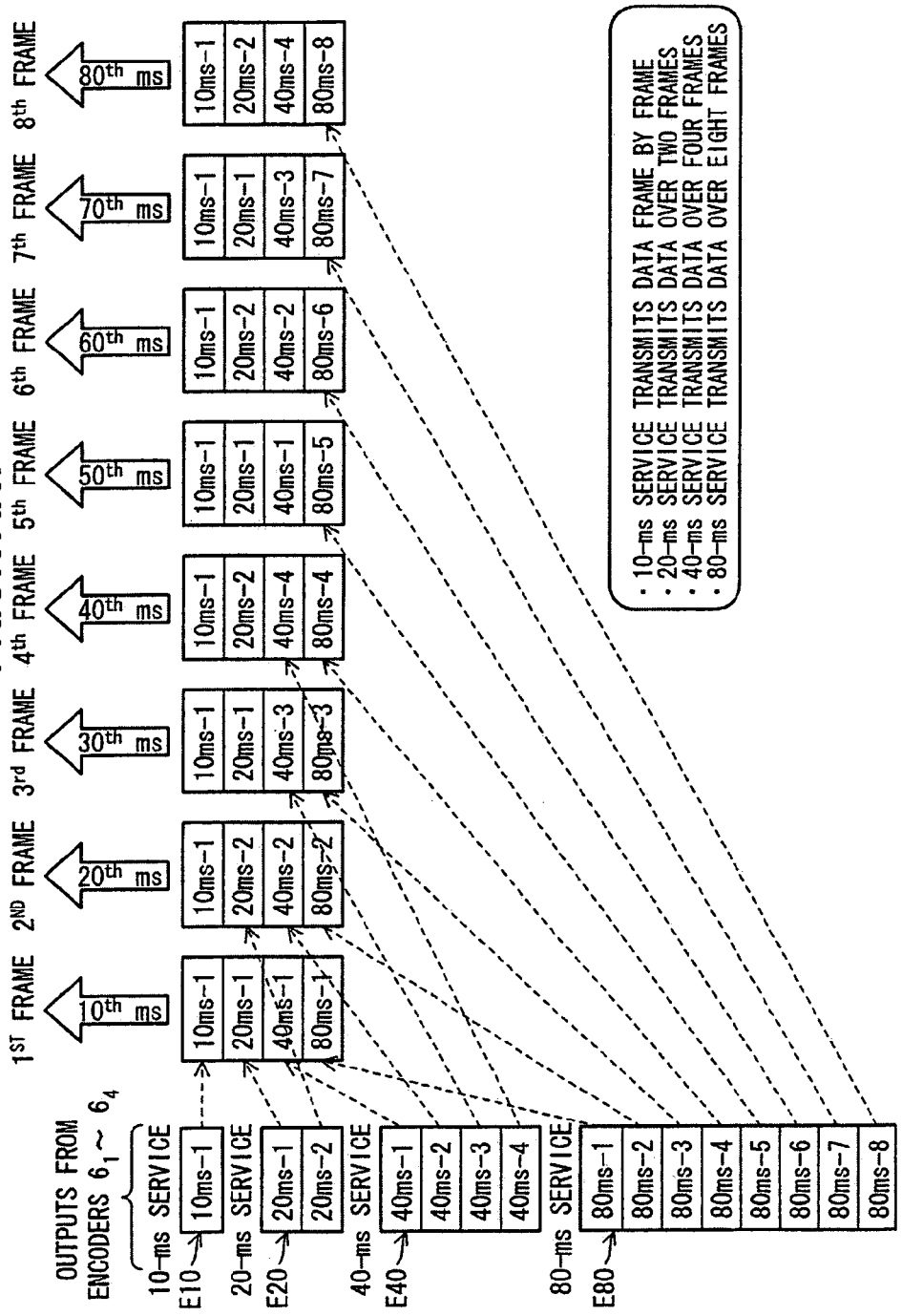
FIG. 19 is a diagram useful in describing a multiplexing method.
Figure 20:
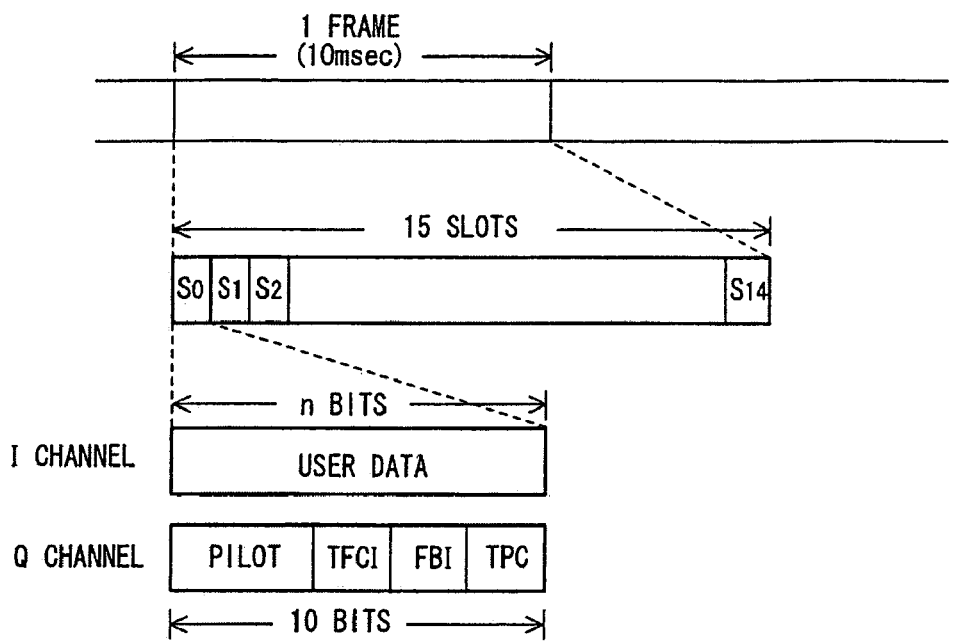
FIG. 20 shows the frame format of an upstream link.
Figure 21:
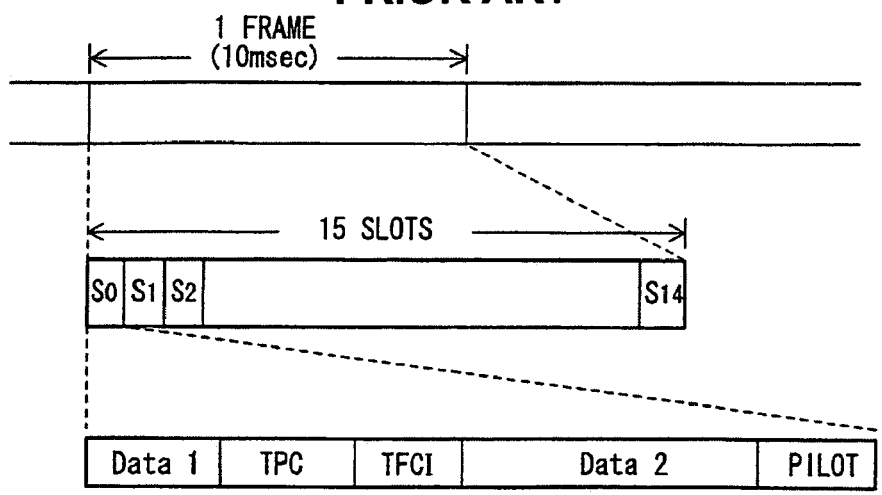
FIG. 21 shows the frame format of a downstream link.
Figure 22:
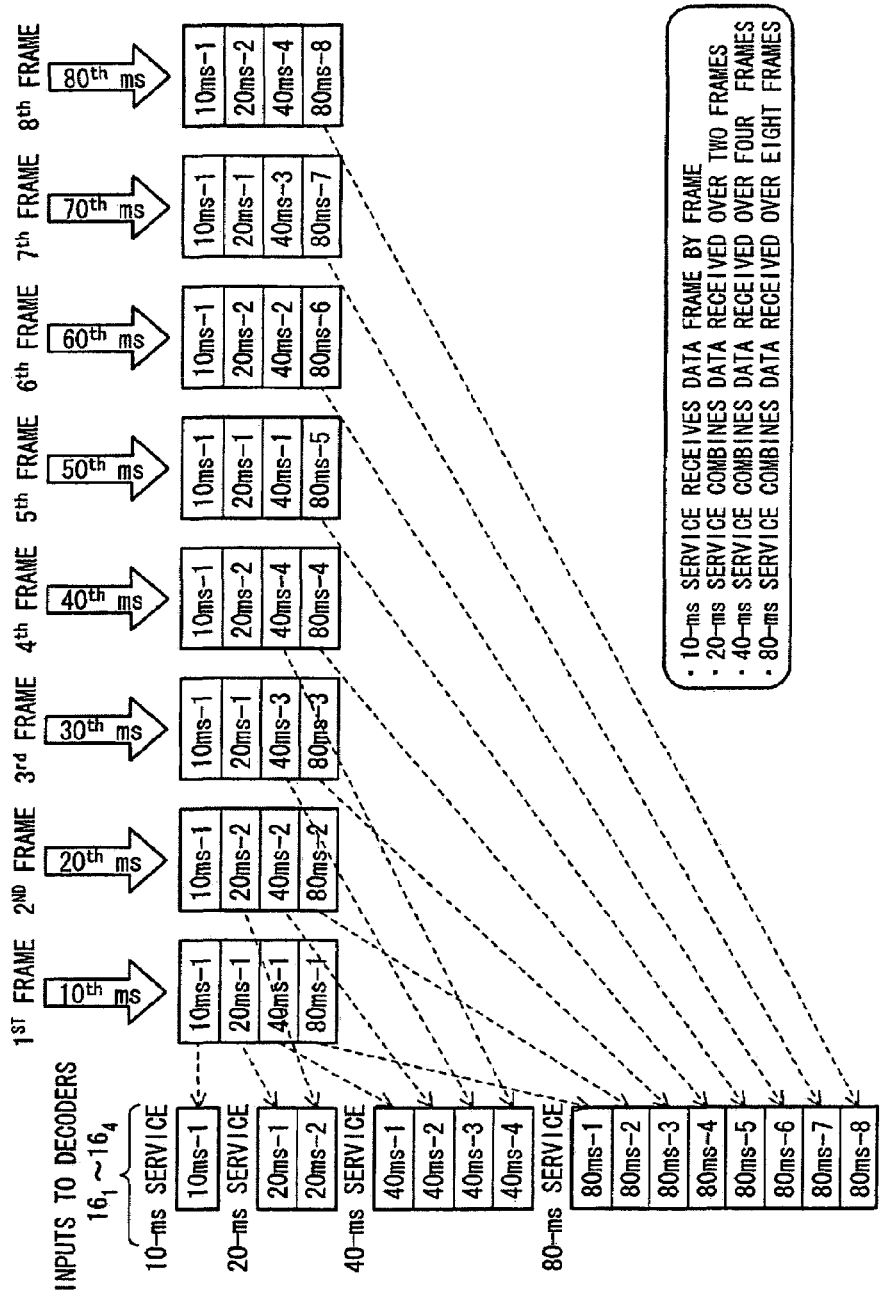
FIG. 22 is a diagram useful in describing a demultiplexing method.
Figure 23:
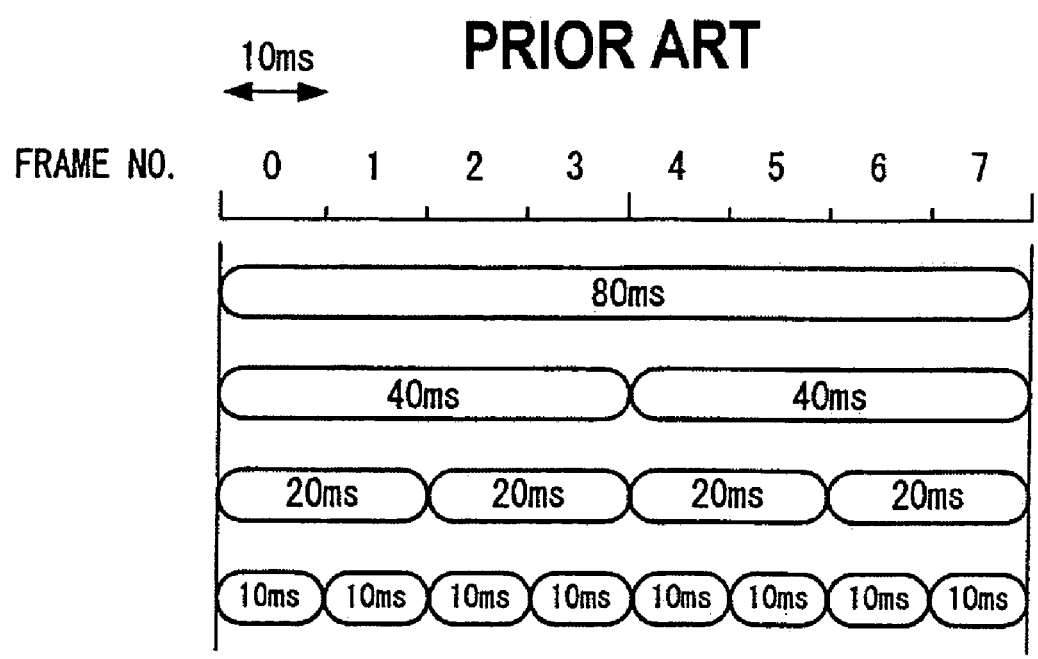
FIG. 23 is a diagram of transceive timing.
Figure 24:
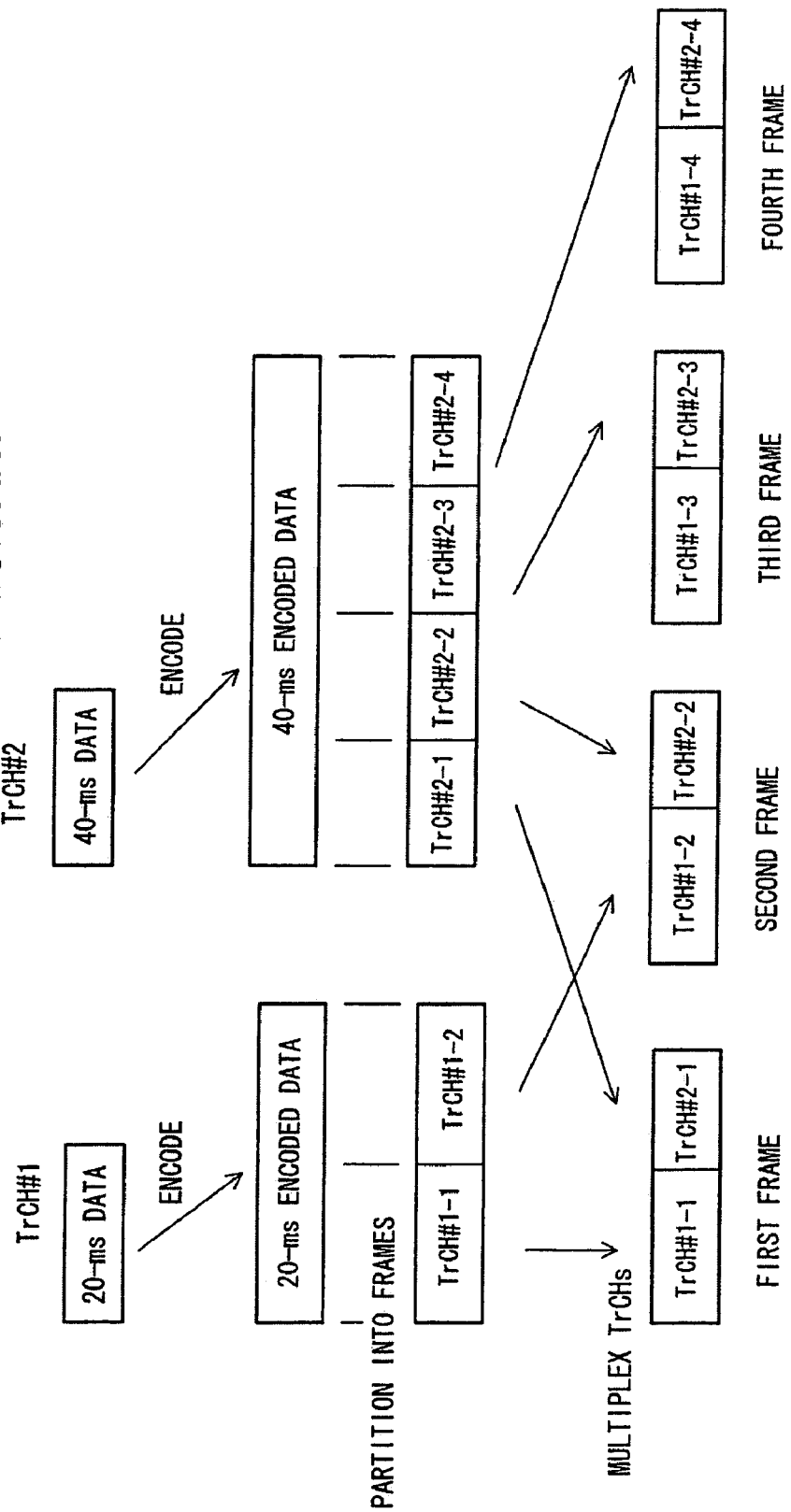
FIG. 24 illustrates an example of processing for multiplexing transport channels (TrCH)

FIG. 17 is a diagram useful in describing an example of notification of a TrCH multiplexing sequence.

If a terminal A originates a call, a base station BS that receives the originate request reports parameters necessary for communication, such as communication starting time (start timing), transmission time interval (TTI) and encoding method, to the originating terminal A and to a terminating terminal B, which is terminal communicating with terminal A. At this time the base station BS decides that the multiplexing sequence of the frame data of the TrCH is the order of decreasing transmission time interval (TTI) and reports this multiplexing sequence to each terminal. In a case where there are a plurality of transport channels (TrCHs) having the same transmission time interval (TTI), a rule that enables the multiplexing sequence to be uniquely decided is made. For example, the rule would be to execute multiplexing in the order of the TrCH numbers. The terminals A and B start communicating from the start timing reported to them.

In a case where it is desired to add on video transceive by turning on a camera during voice communication, or in a case where video transceive is terminated by turning off the camera during voice communication with accompanying video, processing for adding on or deleting a transport channel (TrCH) is executed. At this time also a request to add on or delete video transceive is sent from the terminal side to the base station BS in a manner similar to that of call originate processing. Upon receiving this request, the base station BS notifies the terminals A, B of the time at which the TrCH is added on or deleted and of the conditions (parameters) after the TrCH is added on or deleted. The base station BS also reports the TrCH multiplexing sequence to the terminals upon deciding the sequence after taking into consideration the conditions prevailing after addition or deletion of the TrCH. The terminals A, B start sending and receiving video from the timing reported to them (or stop sending and receiving video when a TrCH is deleted).

If both the terminals and base station possess a common rule for deciding the TrCH multiplexing sequence, it will not be necessary for the base station B to report the TrCH multiplexing sequence to the terminals on each occasion. It will suffice for each of the terminals A, B to determine the TrCH multiplexing sequence through a method the same as that used by the base station BS and to communicate using this multiplexing sequence starting from the communication start timing reported from the base station.

Though a case in which the present invention is applied to a mobile station has been described above, the invention is applicable to a base station as well.

Thus, in accordance with the present invention as described above, use is made of the fact that transport formats (TFIs) of a plurality of frames within a transmission time interval (TTI) are identical in a transport channel (TrCH) having a TTI of 20 ms or greater. Even if TFCI decoding is erroneous and the TFI of each frame develops an error, a correction can be applied as by majority decision and correct TFIs can be detected. As a result, the frame data of each transport channel can be demultiplexed and decoded correctly.

Further, in accordance with the present invention, use is made of the fact that transport formats (TFIs) of a plurality of frames within a transmission time interval (TTI) are identical in a transport channel (TrCH) having a TTI of 20 ms or greater, and of the fact that likelihood, which is calculated when a TFCI is decoded frame by frame, is an index that indicates the correctness of the decoded data. Even if TFCI decoding is erroneous and the TFI of each frame develops an error, a correction can be made to a correct TFI using this likelihood or reliability that can be calculated from likelihood. As a result, the frame data of each transport channel can be demultiplexed and decoded correctly.

Further, in accordance with the present invention, a correction is applied when the TFI of a certain frame in a longest transmission time interval (TTI) is erroneous in a transport channel (TrCH) having the longest transmission time interval (TTI), and it is determined whether the TFIs of a plurality of frames in a transmission time interval inclusive of the corrected frame agree in another transport channel (TrCH). If the TFIs do not agree, it is judged that a TFI in a frame other than the corrected frame is correct and the TFI in this transmission time interval (TTI) is corrected. As a result, the TFI of a transport channel other than the transport channel of the longest transmission time interval (TTI) can be corrected and it is possible to decode user data correctly.

Further, in accordance with the present invention, even if a situation arises in which the transport format (TFI) of a transport channel whose transmission time interval (TTI) is shortest (10 ms) cannot be corrected accurately, user data of another transport channel whose transmission time interval (TTI) is not the shortest can be demultiplexed and decoded correctly.

As many apparently widely different embodiments of the present invention can be made without departing from the spirit and scope thereof, it is to be understood that the invention is not limited to the specific embodiments thereof except as defined in the appended claims.

What is claimed is:

1. A receiving apparatus in a communication system for encoding transmit data of a plurality of channels at respective ones of transmission time intervals (TTIs), partitioning the encoded data of each channel at a frame period to obtain frame data of prescribed bit lengths, transmitting and multiplexing the frame data of each channel, and transmitting, frame by frame, identification information (TFCI) that specifies frame-data length information (TFI) of the frame data on each channel, said apparatus comprising:

a storage unit for storing multiplexed data that has been received;

a discrimination unit for discriminating, frame by frame, frame-data length information (TFI) on each channel based upon the identification information (TFCI) that has been received;

a decision unit for checking whether the frame-data length information (TFIs) of all frames within the transmission time interval (TTI) agree or not on a per-channel basis, and for deciding, when even one TFI differs, that the largest number of items of frame-data length information (TFI) that are the same among the items of frame-data length information in a plurality of frames within a transmission time interval (TTI) is frame-data length information common to all of said plurality of frames within the transmission time interval;

a demultiplexer for identifying bit length per frame of each channel based upon the frame-data length information (TFI) that has been decided, and demultiplexing multiplexed data, which has been stored in the storage unit, channel by channel on the basis of the bit length; and a decoder for joining and decoding, in an amount equivalent to the transmission time interval, frame data that has been demultiplexed on a per-channel basis.

2. A receiving apparatus in a communication system for encoding transmit data of a plurality of channels at respective ones of transmission time intervals (TTIs), partitioning the encoded data of each channel at a frame period to obtain frame data of prescribed bit lengths, transmitting and multiplexing the frame data of each channel, enclosing identification information (TFCI) that specifies frame-data length information (TFI) of the frame data on each channel, and transmitting the encoded information frame by frame, said apparatus comprising:

a storage unit for storing multiplexed data that has been received;

an identification information decoder for decoding the identification information (TFCI) that has been received;

a likelihood holding unit for holding likelihood calculated when the decoding is performed;

a discrimination unit for discriminating, frame by frame, the frame-data length information (TFI) on each channel based upon the identification information that has been decoded;

a decision unit for comparing, on a per-channel basis, frame-data length information of a plurality of frames within respective ones of the transmission time intervals and, when frame-data length information differs, deciding, by using the likelihood, frame-data length information that is common to all of the plurality of frames within the transmission time interval;

a demultiplexer for identifying bit length per frame of each channel based upon the frame-data length information that has been decided, and demultiplexing multiplexed data, which has been stored in the storage unit, channel by channel on the basis of the bit length; and a decoder for joining and decoding, in an amount equivalent to the transmission time interval, frame data that has been demultiplexed on a per-channel basis.

3. A receiving apparatus in a communication system for encoding transmit data of each of a plurality of channels at a prescribed transmission time interval, partitioning the encoded data of each channel at a frame period to obtain frame data of a prescribed bit length, transmitting and multiplexing the frame data of each channel, and transmitting, frame by frame, identification information that specifies a combination of frame-data length information of each channel, said apparatus comprising:

a storage unit for storing multiplexed data that has been received;

a discrimination unit for discriminating, frame by frame, the frame-data length information on each channel based upon the identification information that has been received;

a decision unit for correcting erroneous frame-data length information, among frame-data length information of a plurality of frames within a transmission time interval T1 on a channel whose transmission time interval is T1, to correct frame-data length information, and, when deciding frame-data length information common to a plurality of frames within a transmission time interval T2 on another channel inclusive of a frame corresponding to the corrected frame on said channel whose transmission time interval is T2, deciding upon frame-data length information, which has been discriminated with regard to a frame other than the frame corresponding to the corrected frame, as the common frame-data length information;

a demultiplexer for identifying bit length per frame of each channel based upon the frame-data length information that has been decided, and demultiplexing multiplexed data, which has been stored in said storage unit, channel by channel on the basis of the bit length; and a decoder for joining and decoding, in an amount equivalent to the transmission time interval, frame data that has been demultiplexed on a per-channel basis.

4. The apparatus according to claim 3, wherein T1>T2 holds.

5. A receiving apparatus in a communication system for encoding transmit data of each of a plurality of channels at a prescribed transmission time interval (TTI), partitioning the encoded data of each channel at a frame period to obtain frame data of a prescribed bit length, transmitting and multiplexing the frame data of each channel, and transmitting, frame by frame, identification information (TFCI) that specifies a combination of frame-data length information (TFI) of each channel, said apparatus comprising:

a storage unit for storing multiplexed data that has been received;

a discrimination unit for discriminating, frame by frame, the frame-data length information (TFI) on each channel based upon the identification information (TFCI) that has been received;

a TFI-error detection/correction unit for checking whether the frame-data length information (TFIs) of all frames within the transmission time interval (TTI) agree or not on a per-channel basis, and correcting, when even one TFI differs, an erroneous frame-data length information (TFI);

a demultiplexer for identifying bit length per frame of each channel based upon the frame-data length information (TFI) that has been discriminated or corrected, regarding that frame data of each of the channels has been multiplexed in order of decreasing transmission time interval (TTI) and demultiplexing the multiplexed data, which has been stored in said storage unit, on the basis of the multiplexing sequence and the identified bit length of each channel; and a decoder for joining and decoding, in an amount equivalent to the respective transmission time interval, the frame data that has been demultiplexed on a per-channel basis.

6. A receiving method in a communication system for encoding transmit data of a plurality of channels at respective ones of transmission time intervals (TTIs), partitioning the encoded data of each channel at a frame period to obtain frame data of prescribed bit lengths, transmitting and multiplexing the frame data of each channel, and transmitting, frame by frame, identification information (TFCI) that specifies frame-data length information (TFI) of the frame data of each channel, said method comprising the steps of:

storing multiplexed data that has been received and discriminating, frame by frame, frame-data length information (TFI) on each channel based upon identification information (TFCI) that has been received;

checking whether the frame-data length information (TFIs) of all frames within the transmission time interval (TTI) agree or not on a per-channel basis;

deciding, when even one TFI differs, that the largest number of items of frame-data length information (TFI) that are the same among the items of frame-data length information in a plurality of frames within a transmission time interval (TTI) is frame-data length information common to all of said plurality of frames within the transmission time interval;

identifying bit length per frame of each channel based upon the frame-data length information (TFI) that has been decided;

demultiplexing multiplexed data, which has been stored in the storage unit, channel by channel on the basis of the bit length; and joining and decoding, in an amount equivalent to the transmission time interval, frame data that has been demultiplexed on a per-channel basis.

7. A receiving method in a communication system for encoding transmit data of a plurality of channels at respective ones of transmission time intervals (TTIs), partitioning the encoded data of each channel at a frame period to obtain frame data of prescribed bit lengths, transmitting and multiplexing the frame data of each channel, and transmitting, frame by frame, identification information (TFCI) that specifies frame-data length information (TFI) of the frame data on each channel, said method comprising the steps of:

storing multiplexed data that has been received, decoding the identification information (TFCI) that has been received and holding likelihood calculated when the decoding is performed;

discriminating the frame-data length information (TFI) on each channel based upon the identification information that has been decoded;

comparing, on a per-channel basis, frame-data length information of a plurality of frames within respective ones of the transmission time intervals and, when frame-data length information differs, deciding, by using the likelihood, frame-data length information that is common to all of the plurality of frames within the transmission time interval;

identifying bit length per frame of each channel based upon the frame-data length information that has been decided;

demultiplexing multiplexed data, which has been stored, channel by channel on the basis of the bit length; and joining and decoding, in an amount equivalent to the transmission time interval, frame data that has been demultiplexed on a per-channel basis.

8. A receiving method in a communication system for encoding transmit data of each of a plurality of channels at a prescribed transmission time interval, partitioning the encoded data of each channel at a frame period to obtain frame data of a prescribed bit length, transmitting and multiplexing the frame data of each channel, and transmitting, frame by frame, identification information that specifies a combination of frame-data length information of each channel, said method comprising the steps of:

storing multiplexed data that has been received and discriminating, frame by frame, the frame-data length information on each channel based upon the identification information that has been received;

correcting erroneous frame-data length information, among frame-data length information of a plurality of frames within a transmission time interval TI on a channel whose transmission time interval is TI, to correct frame-data length information, and, when deciding frame-data length information common to a plurality of frames within a transmission time interval T2 on another channel inclusive of frame corresponding to the corrected frame on said channel whose transmission time interval is T2, deciding upon frame-data length information, which has been discriminated with regard to a frame other than the frame corresponding to the corrected frame, as the common frame-data length information;

identifying bit length per frame of each channel based upon the frame-data length information that has been decided;

demultiplexing multiplexed data, which has been stored, channel by channel on the basis of the bit length; and joining and decoding, in an amount equivalent to the transmission time interval, frame data that has been demultiplexed on a per-channel basis.

9. A receiving method in a communication system for encoding transmit data of each of a plurality of channels at a prescribed transmission time interval (TTI), partitioning the encoded data of each channel at a frame period to obtain frame data of a prescribed bit length, transmitting and multiplexing the frame data of each channel, and transmitting, frame by frame, identification information (TFCI) that specifies a combination of frame-data length information (TTI) of each channel, said method comprising the steps of:

storing multiplexed data that has been received and discriminating, frame by frame, the frame-data length information (TFI) on each channel based upon the identification information (TFCI) that has been received;

checking whether the frame-data length information (TFIs) of all frames within the transmission time interval (TTI) agree or not on a per-channel basis, and correcting, when even one TFI differs, an erroneous frame-data length information (TFI);

identifying bit length per frame of each channel based upon the frame-data length information (TFI) that has been discriminated or corrected;

regarding that frame data of each of the channels has been multiplexed in order of decreasing transmission time interval (TTI) and demultiplexing the stored multiplexed data on the basis of the multiplexing sequence and the identified bit length of each channel; and joining and decoding, in an amount equivalent to the respective transmission time interval, the frame data that has been demultiplexed on a per-channel basis.

10. A receiving apparatus in a CDMA communication system for encoding transmit data of each of a plurality of transport channels at a predetermined transmission time interval (TTI), partitioning the encoded data of each transport channel at a frame period to obtain frame data of a prescribed bit length, multiplexing and transmitting the frame data of each transport channel, and transmitting, frame by frame, combination information (TFCI) of transport formats (TFIs) that specify the frame data length of each transport channel, said apparatus comprising:

a storage unit for storing multiplexed data that has been received;

a transport format discrimination unit for decoding the TFCI frame by frame and discriminating a transport format (TFI) in each transport channel frame by frame based upon the TFCI;

a transport format decision unit for comparing, on a per-transport-channel basis, transport formats (TFIs) on a plurality of frames within a prescribed transmission time interval (TTI) that conforms to the transport channel and, when transport formats differ, deciding a transport format (TFI) in the transmission time interval (TTI) by majority decision;

a demultiplexer for identifying bit length per frame of each transport channel based upon the transport format (TFI) decided and demultiplexing multiplexed data, which has been stored in said storage unit, channel by channel on the basis of the bit length; and a decoder for joining and decoding, in an amount equivalent to the transmission time interval, frame data that has been demultiplexed on a per-transport-channel basis.

11. A receiving apparatus in a CDMA communication system for encoding transmit data of each of a plurality of transport channels at a predetermined transmission time interval (TTI), partitioning the encoded data of each transport channel at a frame period to obtain frame data of a prescribed bit length, multiplexing and transmitting the frame data of each transport channel, and transmitting, frame by frame, combination information (TFCI) of transport formats (TFIs) that specify the frame data length of each transport channel, said apparatus comprising:

a storage unit for storing multiplexed data that has been received;

a TFCI decoder for decoding the TFCI frame by frame;

a likelihood holding unit for holding likelihood calculated when the decoding is performed;

a transport format discrimination unit for discriminating, frame by frame, the transport format (TFI) on each transport channel based upon the TFCI that has been decoded;

a transport format decision unit for comparing, on a per-transport-channel basis, transport formats (TFIs) of a plurality of frames within a transmission time interval (TTI) that conforms to the transport channel and, when transport formats differ, deciding a transport format (TFI) in the transmission time interval (TTI) using likelihood and transport format (TFI) of each frame;

a demultiplexer for identifying bit length per frame of each transport channel based upon the transport format decided and demultiplexing and multiplexed data, which has been stored in said storage unit, channel by channel on the basis of the bit length; and a decoder for joining and decoding, in an amount equivalent to the transmission time interval, frame data that has been demultiplexed on a per-transport-channel basis.

12. The apparatus according to claim 11, wherein said transport format decision unit totals the likelihoods of identical transport formats (TFIs) and decides upon the transport format (TFI) for which the total of the likelihoods is largest as the transport format (TFI) in the transmission time interval (TTI).

13. The apparatus according to claim 11, wherein said TFCI decoder decides upon a TFCI candidate, which has the highest likelihood among the likelihoods of TFCI candidates calculated at the time of decoding, as the TFCI in a frame of interest, calculates degree of reliability of the TFCI using the likelihood of each TFCI candidate and holds the degree of reliability calculated; and said transport format decision unit decides upon a transport format (TFI) for which the degree of reliability is highest as the transport format (TFI) in the transmission time interval (TTI).

14. A receiving apparatus in a CDMA communication system for encoding transmit data of each of a plurality of transport channels at a predetermined transmission time interval (TTI), partitioning the encoded data of each transport channel at a frame period to obtain frame data of prescribed bit length, multiplexing and transmitting the frame data of each transport channel, and transmitting, frame by frame, combination information (TFCI) of transport formats (TFIs) that specify the frame data length of each transport channel, said apparatus comprising:

a storage unit for storing multiplexed data that has been received;

a TFCI decoder for decoding the TFCI frame by frame;

a transport format discrimination unit for discriminating, frame by frame, the transport format (TFI) on each transport channel based upon the TFCI that has been decoded;

a transport format decision unit which, in a transport channel of a longest transmission time interval (TTI), is for correcting, to a correct TFI, an erroneous transport format (TFI) among transport formats (TFIs) of a plurality of frames within the longest transmission time interval, and which, in a different transport channel, is for checking to determine whether transport formats (TFIs) of a plurality of frames within a transmission time interval that conforms to the other transport channel inclusive of the corrected frame agree, said transport format decision unit judging, when transport formats do not agree, that a transport format in a frame other than the corrected frame is correct and deciding the transport format (TFI) in the transmission time interval (TTI);

a demultiplexer for identifying bit length per frame of each transport channel based upon the transport format decided and demultiplexing the multiplexed data, which has been stored in said storage unit, channel by channel on the basis of the bit length; and a decoder for joining and decoding, in an amount equivalent to the transmission time interval, frame data that has been demultiplexed on a per-transport-channel basis.

15. A receiving method in a CDMA communication system for encoding transmit data of each of a plurality of transport channels at a predetermined transmission time interval (TTI), partitioning the encoded data of each transport channel at a frame period to obtain frame data of a prescribed bit length, multiplexing and transmitting the frame data of each transport channel, and transmitting, frame by frame, combination information (TFCI) of transport formats (TFIs) that specify the frame data length of each transport channel, said method comprising the steps of:

storing received multiplexed data and decoding a TFCI frame by frame;

discriminating a transport format (TFI) in each transport channel frame by frame based upon the TFCI of every frame;

comparing, on a per-transport-channel basis, transport formats (TFIs) of a plurality of frames within a transmission time interval (TTI) that conforms to the transport channel and, when transport formats differ, deciding a transport format (TFI) in the transmission time interval (TTI) by majority decision;

identifying bit length per frame of each transport channel based upon the transport format (TFI) decided;

demultiplexing the stored multiplexed data channel by channel on the basis of the bit length; and joining and decoding, in an amount equivalent to the transmission time interval, frame data that has been demultiplexed on a per-transport-channel basis.

16. A receiving method in a CDMA communication system for encoding transmit data of each of a plurality of transport channels at a predetermined transmission time interval (TTI), partitioning the encoded data of each transport channel at a frame period to obtain frame data of a prescribed bit length, multiplexing and transmitting the frame data of each transport channel, and transmitting, frame by frame, combination information (TFCI) of transport formats (TFIs) that specify the frame data length of each transport channel, said method comprising the steps of:

storing multiplexed data that has been received, decoding the TFCI frame by frame;

a likelihood holding unit for holding likelihood calculated when the decoding is performed;

discriminating a transport format (TFI) in each transport channel frame by frame based upon the TFCI of every frame;

comparing, on a per-transport-channel basis, transport formats (TFIs) of a plurality of frames within a transmission time interval (TTI) that conforms to the transport channel and, when transport formats differ, deciding a transport format (TFI) in the transmission time interval (TTI) using the likelihood and transport format (TFI) of each frame;

identifying bit length per frame of each transport channel based upon the transport format (TFI) decided;

demultiplexing the stored multiplexed data channel by channel on the basis of the bit length; and joining and decoding, in an amount equivalent to the transmission time interval, frame data that has been demultiplexed on a per-transport-channel basis.

17. The method according to claim 16, further comprising the step of totaling the likelihoods of identical transport formats (TFIs) and deciding upon the transport format (TFI) for which the total of the likelihoods is largest as the transport format (TFI) in the transmission time interval (TTI).

18. The meted according to claim 16, further comprising the steps of:

deciding upon a TFCI candidate, which has the highest likelihood among the likelihoods of TFCI candidates calculated at the time of decoding, as the TFCI in a frame of interest, calculating degree of reliability of the TFCI using the likelihood of each TFCI candidate, and holding the degree of reliability calculated; and deciding upon a transport format (TFI) for which the degree of reliability is highest as the transport format (TFI) in the transmission time interval (TTI).

19. A receiving method in a CDMA communication system for encoding transmit data of each of a plurality of transport channels at a predetermined transmission time interval (TTI), partitioning the encoded data of each transport channel at a frame period to obtain frame data of a prescribed bit length, multiplexing and transmitting the frame data of each transport channel, and transmitting, frame by frame, combination information (TFCI) of transport formats (TFIs) that specify the frame data length of each transport channel, said method comprising the steps of:

storing received multiplexed data and decoding a TFCI frame by frame:

discriminating, frame by frame, the transport format (TFI) on each transport channel based upon the TFCI that has been decoded;

in a transport channel of a longest transmission time interval (TTI), correcting, to a correct TFI, an erroneous transport format (TFI) among transport formats (TFIs) of a plurality of frames within the longest transmission time interval, in a different transport channel, checking to determine whether transport formats (TFIs) of a plurality of frames within a transmission time interval that conforms to the other transport channel inclusive of the corrected frame agree and, when transport formats do not agree, deciding that a transport format in a frame other than the corrected frame is correct and correcting the transport format (TFI) in the transmission time interval (TTI);

identifying bit length per frame of each transport channel based upon the corrected transport format (TFI);

demultiplexing the stored multiplexed data channel by channel on the basis of the bit length; and joining and decoding, in an amount equivalent to the transmission time interval, frame data that has been demultiplexed on a per-transport-channel basis.

* * * * *